United States Patent
Lee et al.

(10) Patent No.: US 7,350,371 B2
(45) Date of Patent: Apr. 1, 2008

(54) INDOOR DEVICE OF SEPARABLE AIR CONDITIONER

(75) Inventors: Sang Hun Lee, Changwon-si (KR); Ju Ho Ock, Masan-si (KR); In Hee Park, Changwon-si (KR); Jae Buem Bae, Jinju-si (KR); Inn Ku Hur, Seoul (KR); Myeong Shik Kim, Changwon-si (KR); Yong Woo Kim, Jinhae-si (KR); Chang Yoon Woo, Changwon-si (KR)

(73) Assignee: LG Electronics Inc., Seoul (KR)

( * ) Notice: Subject to any disclaimer, the term of this patent is extended or adjusted under 35 U.S.C. 154(b) by 200 days.

(21) Appl. No.: 11/081,750

(22) Filed: Mar. 17, 2005

(65) Prior Publication Data

US 2005/0284168 A1 Dec. 29, 2005

(30) Foreign Application Priority Data

Jun. 29, 2004 (KR) .................... 10-2004-0049732
Jul. 12, 2004 (KR) .................... 10-2004-0054084

(51) Int. Cl.
*F25D 17/04* (2006.01)
*F25D 17/06* (2006.01)

(52) U.S. Cl. .......................... 62/317; 62/427

(58) Field of Classification Search ............. 62/259.1, 62/262, 263, 298, 302, 303, 317, 427; 96/15, 96/96; 165/96, 119; 454/155, 158
See application file for complete search history.

(56) References Cited

U.S. PATENT DOCUMENTS

| | | | | |
|---|---|---|---|---|
| 5,388,426 A | * | 2/1995 | Wada et al. ................... 62/263 |
| 5,573,059 A | * | 11/1996 | Hamamoto et al. ......... 165/124 |
| 5,600,963 A | * | 2/1997 | Koo et al. ..................... 62/262 |
| 6,155,068 A | * | 12/2000 | Hironaka ...................... 62/303 |
| 6,164,082 A | * | 12/2000 | Okamoto et al. ............. 62/317 |
| 6,178,765 B1 | * | 1/2001 | Hironaka et al. ............. 62/303 |
| 6,223,547 B1 | * | 5/2001 | da Silva et al. .............. 62/262 |
| 6,338,382 B1 | * | 1/2002 | Takahashi et al. ........... 165/96 |
| 6,363,734 B1 | * | 4/2002 | Aoyagi ........................ 62/264 |
| 6,725,684 B2 | * | 4/2004 | Lee et al. ..................... 62/298 |
| 6,729,154 B2 | * | 5/2004 | Takashima et al. .......... 62/317 |
| 6,782,707 B2 | * | 8/2004 | Shindo et al. ................ 62/264 |
| 6,796,132 B1 | * | 9/2004 | Hille et al. .................... 62/89 |
| 6,892,551 B2 | * | 5/2005 | Gunji et al. .................. 62/262 |

FOREIGN PATENT DOCUMENTS

| | | |
|---|---|---|
| CN | 1232948 A | 10/1999 |
| CN | 1405504 A | 3/2003 |
| EP | 0 769 664 A2 | 4/1997 |

(Continued)

*Primary Examiner*—Mohammad M. Ali
(74) *Attorney, Agent, or Firm*—Birch, Stewart, Kolasch & Birch, LLP

(57) ABSTRACT

Disclosed is an air conditioner enabling to perform an air purifying function in an optimum state according to a pollution level of room air, the air conditioner including a cabinet having a first air inlet for drawing in the air, and an air outlet for discharging purified air, a fan provided at the cabinet and forcing the air movement, and a filter unit or a suction grill selectively provided at the first air inlet.

21 Claims, 23 Drawing Sheets

FOREIGN PATENT DOCUMENTS

| | | | | |
|---|---|---|---|---|
| JP | 10-232025 | A | * | 9/1998 |
| JP | 11-264604 | A | * | 9/1999 |
| JP | 2000-65420 | A | * | 3/2000 |
| JP | 2000-227234 | A | * | 8/2000 |
| JP | P2000-249390 | A | * | 9/2000 |
| JP | 2002-364908 | A | * | 12/2002 |
| JP | 2003-4292 | A | * | 1/2003 |
| JP | 2003-207161 | A | * | 7/2003 |
| JP | 2003-240331 | A | * | 8/2003 |
| JP | 2004-138310 | A | | 5/2004 |
| JP | 2004-150713 | A | | 5/2004 |

\* cited by examiner

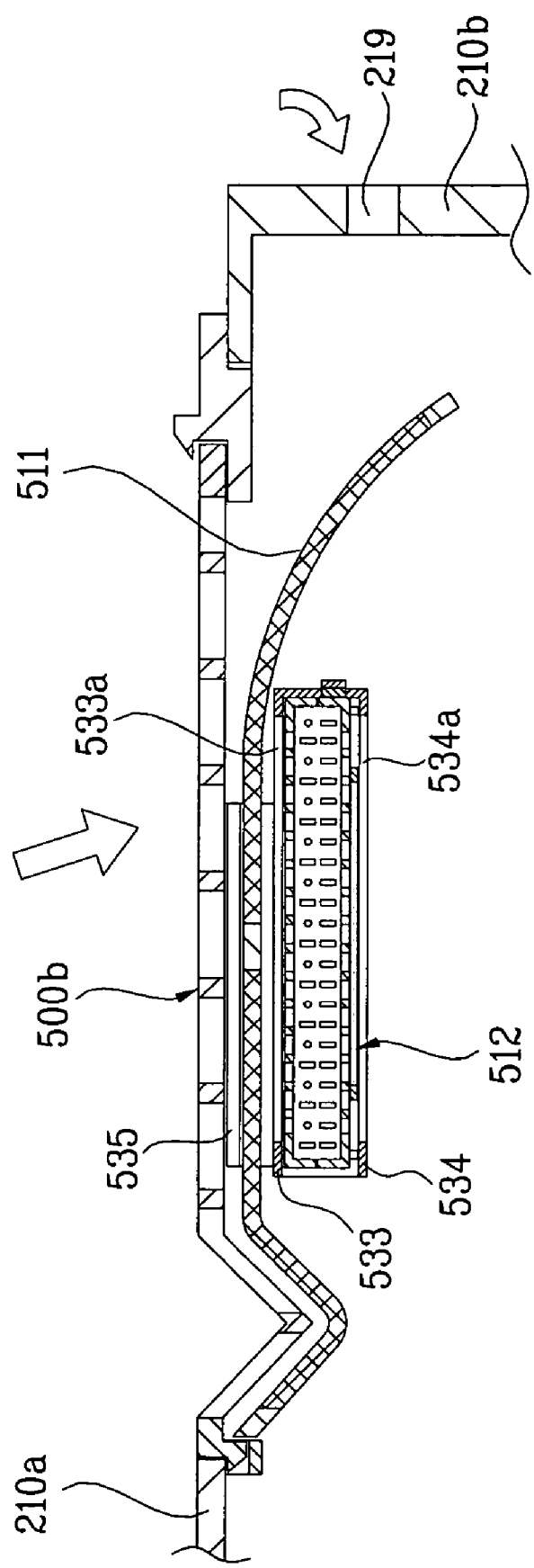

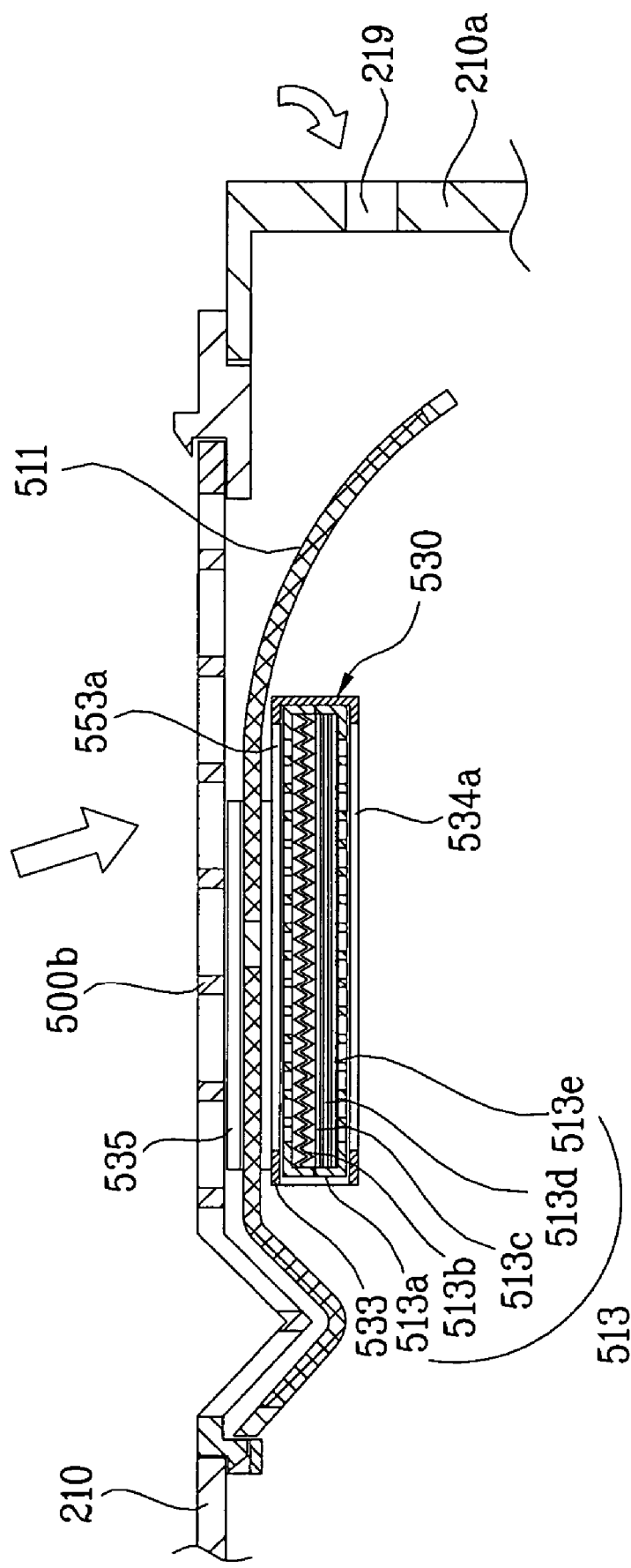

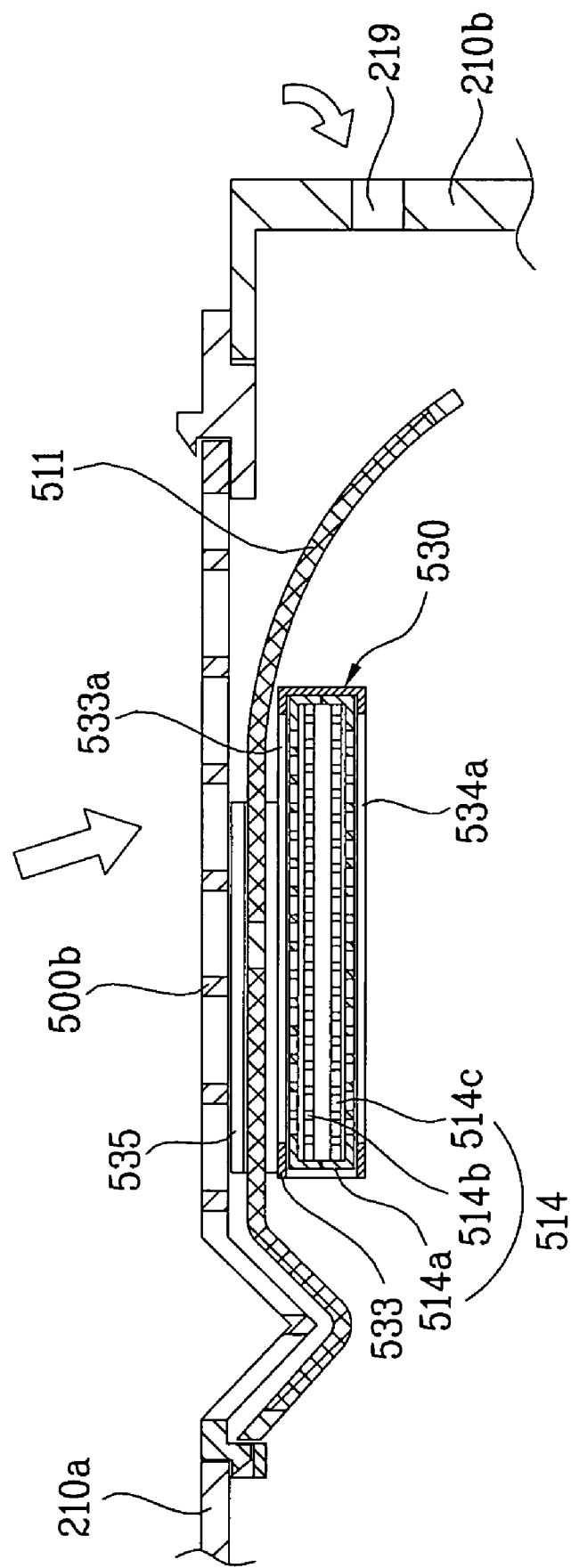

INDOOR DEVICE OF SEPARABLE AIR CONDITIONER

CROSS-REFERENCE TO RELATED APPLICATIONS

This application claims the benefit of Korean Application No. P2004-49732, filed on Jun. 29, 2004 and Korean Application No. P2004-54084, filed on Jul. 12, 2004, which are hereby incorporated by reference as if fully set forth herein.

BACKGROUND OF THE INVENTION

1. Field of the Invention

The present invention relates to a separate type air conditioner, and more particularly, to an indoor unit of an air conditioner, provided in a room so as to cool/heat the room.

2. Discussion of the Related Art

In general, an air conditioner is an apparatus for controlling temperature and humidity of air in a particular area according to a use. As an example of the air conditioner, there is an apparatus having a compressor and a heat exchanger, and flowing a refrigerant so as to cool/heat an interior space such as a restaurant, a library, or an office. The air conditioner is divided into am integrated type air conditioner and a separate type air conditioner.

The integrated type air conditioner includes an indoor unit having a heat exchanger for cooling/heating the room, and an outdoor unit having a heat exchanger fir exchanging heat with the outside air and a compressor for compressing the refrigerant at a high temperature with a high pressure.

In this case, the indoor unit and the outdoor unit are separately provided at inside or outside of a room, respectively, and connected with each other via a refrigerant pipe.

Hereinafter, the indoor unit of the separate type air conditioner in accordance with a related art will be described with reference to the appended drawings.

FIG. 1 is a perspective view showing an indoor unit of a separate type air conditioner in accordance with a related art, and FIG. 2 is a cross sectional view showing the indoor unit of the separate type air conditioner in accordance with the related art.

Referring to FIG. 1 and FIG. 2, the indoor unit of the separate type air conditioner in accordance with the related art includes a cabinet 10, a heat exchanger 20 provided in the cabinet 10, and a fan 30 provided at a lower part of the heat exchanger 20 for forcing airflow.

In this instance, a front air inlet (not shown) is provided on a front surface of the cabinet 10, an upper air inlet (not shown) is provided on an upper surface thereof, and an air outlet 11 is provided at a lower part thereof.

A front suction grill 12 and a top suction grill 13 are provided at the front air inlet and the top air inlet, respectively. In this case, the top suction grill 13 and the cabinet 10 are formed as a single body.

A front filter 14 is provided inside of the front suction grill 12 so as to purify the air drawn through the front air suction inlet.

Meanwhile, the cabinet 10 includes a louver 15 for controlling the air discharged to the outlet in a left/right direction, and a vein 16 for controlling the air discharged to the air outlet 11 in an up/down direction.

The indoor unit of the related art with the aforementioned structural elements draws in the air from outside of the cabinet 10 through the operation of the fan 30, i.e., from the room, and the air drawn into the indoor unit is cooled/heated at the heat exchanger 20 and then discharged back to the room so as to cool/heat the room.

In the indoor unit of the air conditioner in accordance with the related art, only the air drawn in through the front air inlet 12 is purified by the front filter 14, but the air drawn in through the top air inlet having the top suction grill provided thereat is discharged to the room without being purified, resulting in a problem that the air is insufficiently purified.

When a separate filter is provided in the cabinet 10 to purify the air drawn in through the top air inlet, there is a problem that it is difficult to replace the separate filter and the structure of the cabinet becomes complicated, thereby increasing a manufacturing cost.

Therefore, in recent years, development of an air conditioner is demanded, which enables to perform the air conditioning function in an optimal state according to a pollution level of room air.

SUMMARY OF THE INVENTION

Accordingly, the present invention is directed to an air conditioner that substantially obviates one or more problems due to limitations and disadvantages of the related art.

An object of the present invention is to provide an air conditioner enabling to perform an air purifying function in an optimum state according to a pollution level of room air.

Another object of the present invention is to provide an air conditioner having a structure making it easy to attach/detach a filter for purifying air.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an air conditioner including a cabinet having a first air inlet for drawing in the air, and an air outlet for discharging purified air, a fan provided at the cabinet and forcing the air movement, and a filter unit or a suction grill selectively provided at the first air inlet.

The filter unit includes a filter case having an air inlet and a first air outlet formed thereon, the first air outlet communicating with the first air inlet of the cabinet, and a filter accommodated in the filter case and purifying the air.

The filter case includes a placement/withdrawal guide for guiding the placement/withdrawal of the filter.

The placement/withdrawal guide includes a rib protruded from an inner wall of the filter case and having a filter slid thereinto.

The filter case further includes a louver being rotatable for opening and closing the air inlet of the filter case. In this case, the louver guides the air drawn through the air inlet of the filter case to the filter.

The air conditioner further including an auxiliary filter unit provided inside of the suction grill and, together with the suction grill, attached/detached to/from the cabinet.

The auxiliary filter unit includes an auxiliary filter for purifying the air, and a filter receiving member for accommodating the auxiliary filter.

The filter receiving member includes an auxiliary filter guide fir supporting the auxiliary filter and guiding the placement/withdrawal of the auxiliary filter.

The auxiliary filter unit and the suction grill are formed as a single body.

The filter unit is detachably provided at the suction grill.

The cabinet further includes a second air inlet.

In another aspect of the present invention, an air conditioner including a cabinet of an indoor unit having a first air inlet formed on an upper surface thereof, the first air inlet selectively including a filter unit or a suction grill for purifying the air, a second air inlet formed on a front surface thereof, and an air outlet for discharging purified air, a fan provide at the cabinet and forcing the air movement, and a front panel for opening/closing the second air inlet.

The filter unit includes a filter case having an air inlet and a first air outlet, the first air outlet communicating with the first air inlet of the cabinet, and a filter accommodated in the filter case and purifying the air drawn therein.

The filter case further includes a louver being rotated for opening/closing the air inlet of the filter case. In this case, the louver guides the air drawn through the air inlet of the filter case to the filter.

The air conditioner further including an auxiliary filter unit provided at a lower part of the suction grill and, together with the suction grill, attached/detached to/from the cabinet.

The auxiliary filter unit includes an auxiliary filter for purifying the air, and a filter receiving member for accommodating the auxiliary filter.

The filter receiving member includes an auxiliary filter guide for supporting the auxiliary filter and guiding the placement/withdrawal of the auxiliary filter.

The auxiliary filter guide includes at least one opening formed on a side thereof and through which the auxiliary filter is place/withdraw.

The auxiliary filter is slid from the front of the auxiliary filter guide so as to be provided thereat.

The filter receiving member is pierced in an up and down direction such that the air drawn through the suction grill is flowed downward thereof.

The auxiliary filter unit is integrated into the suction grill.

The auxiliary filter unit is separably provided at the suction grill.

When the auxiliary filter unit is separably provided at the suction grill, one of the suction grill and the auxiliary filter unit includes a hook, and the other one includes a hook recess in which the hook is caught.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIG. 21 illustrates a cross sectional view showing the suction grill of FIG. 20;

FIG. 22 illustrates a cross sectional view showing a fourth embodiment of the suction grill provided at the air conditioner in accordance with the present invention; and FIG. 23 illustrates a cross sectional view showing a fifth embodiment of the suction grill provided at the air conditioner in accordance with the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
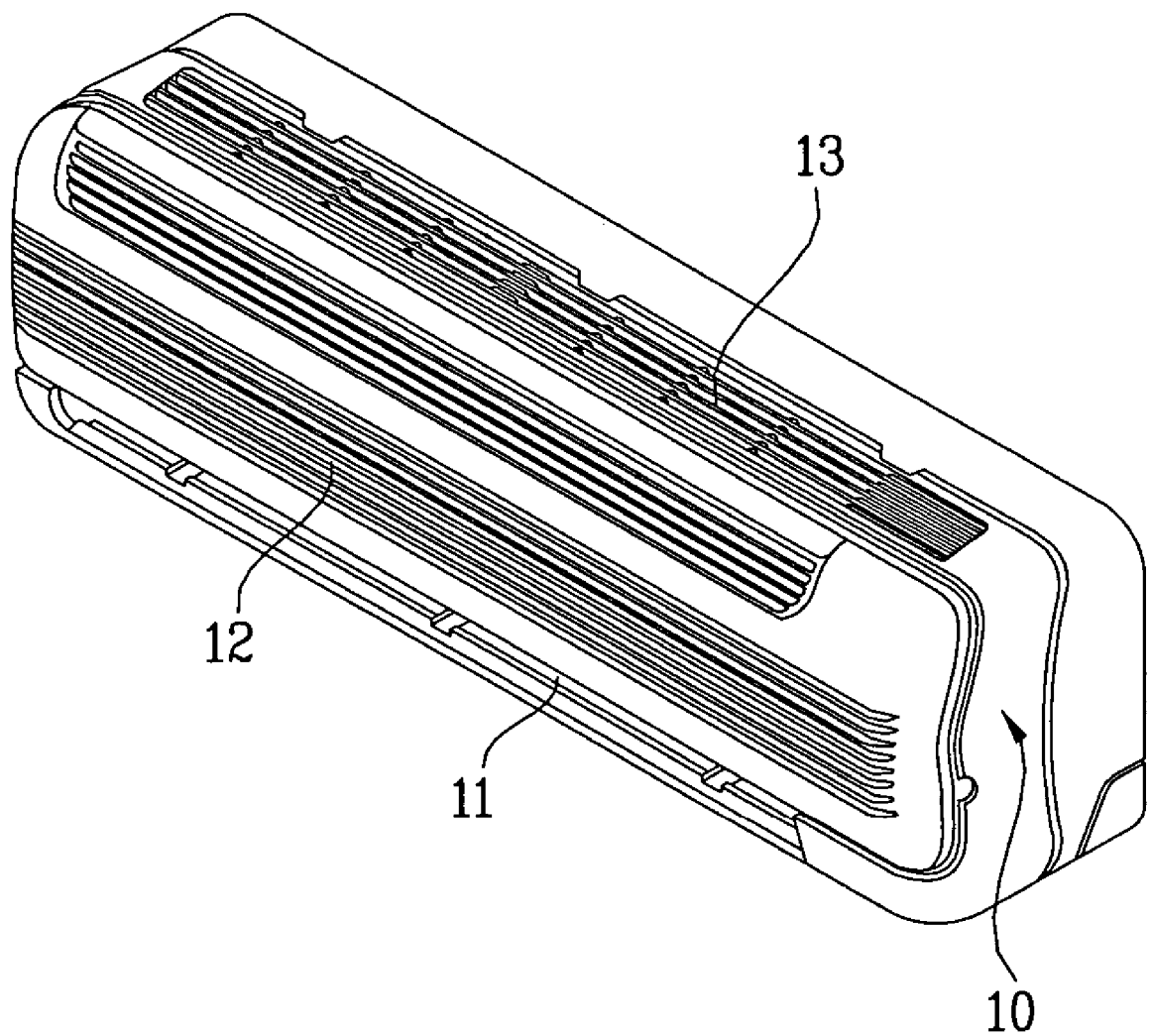
FIG. 1 illustrates a perspective view showing an indoor unit of an air conditioner in accordance with a related art.
Figure 2:
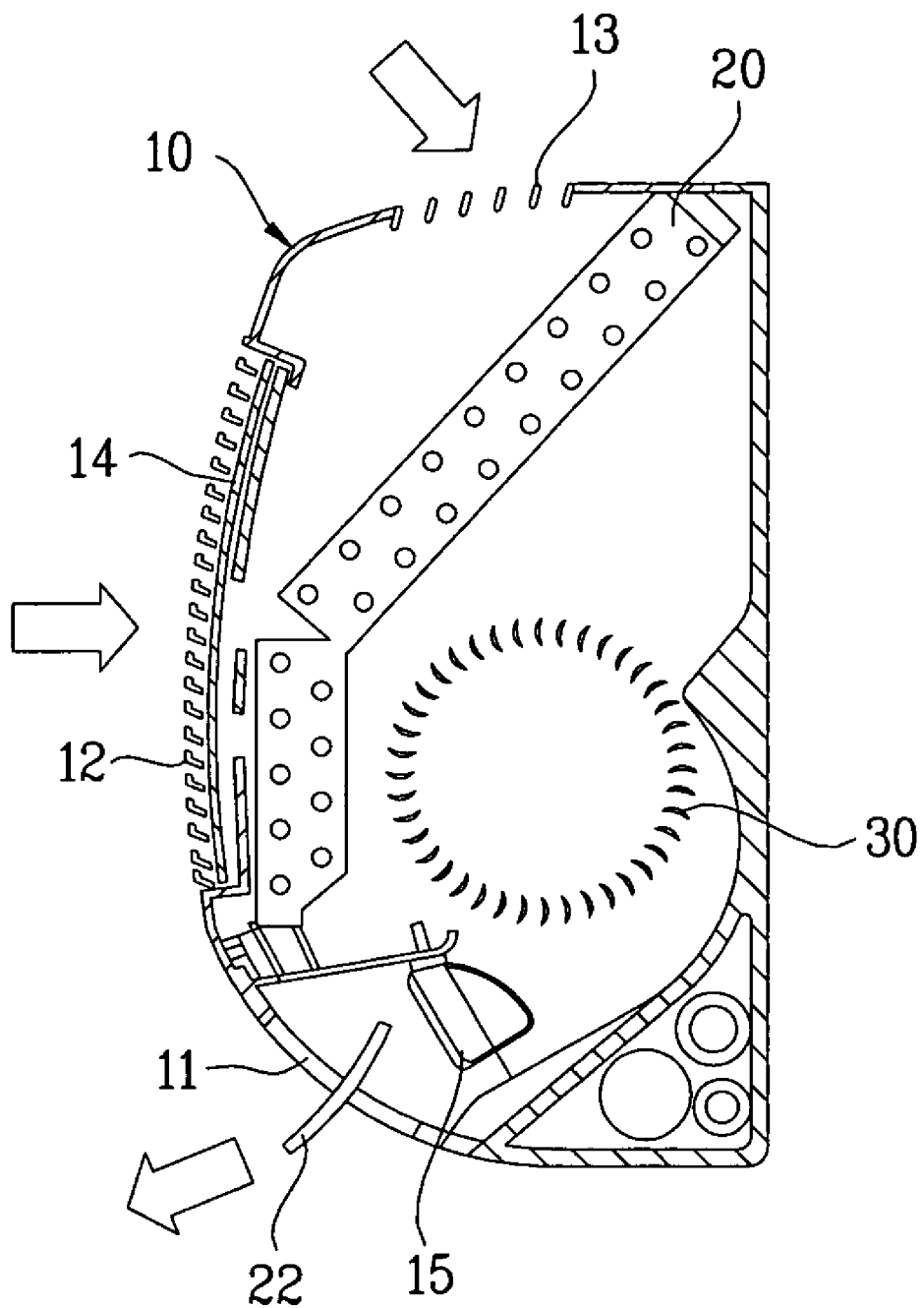
FIG. 2 illustrates a cross sectional view showing the indoor unit of the air conditioner in accordance with the related art.
Figure 3:
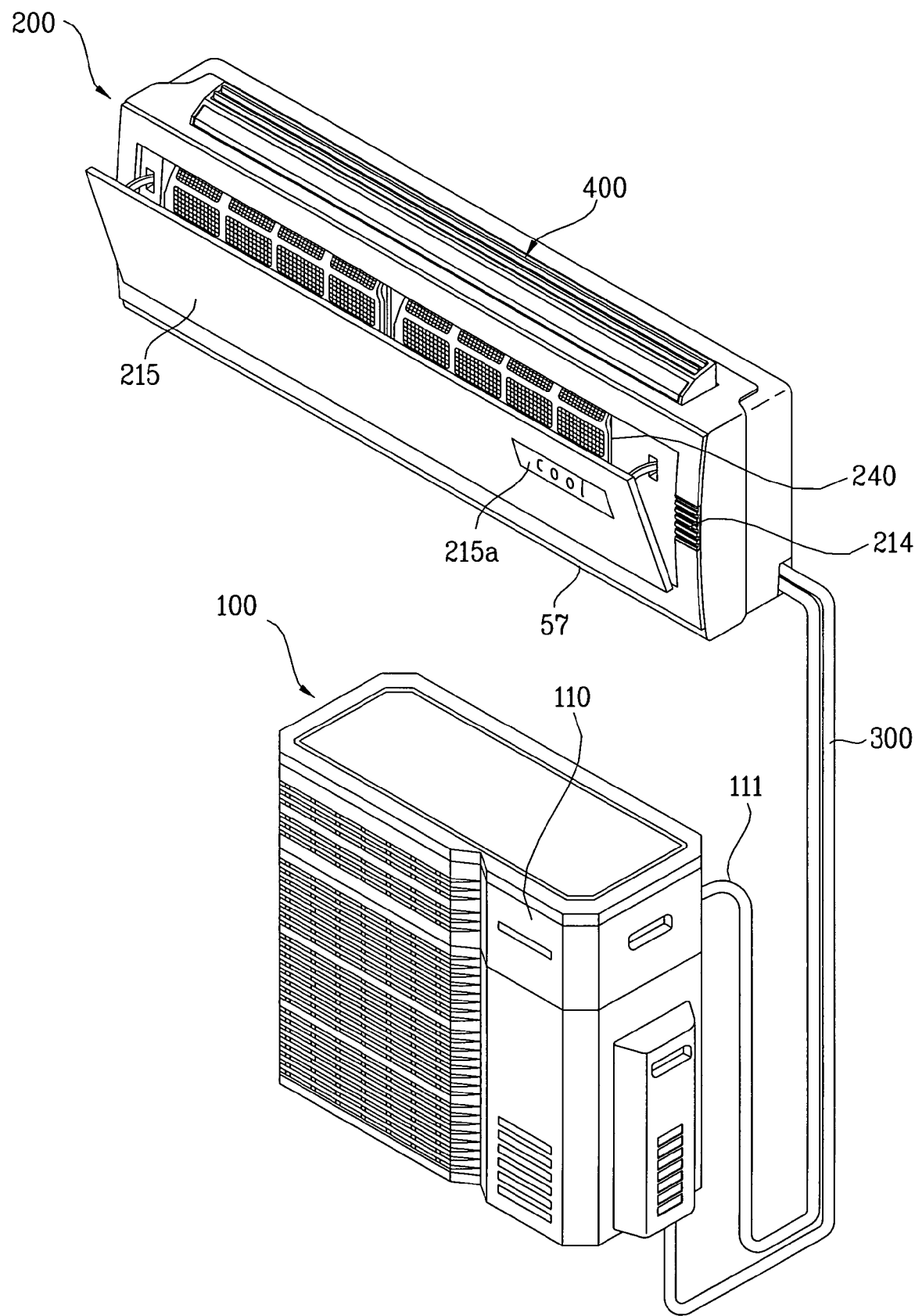
FIG. 3 illustrates a perspective view showing an embodiment of an air conditioner with a filter unit in accordance with the present invention.
Figure 4:
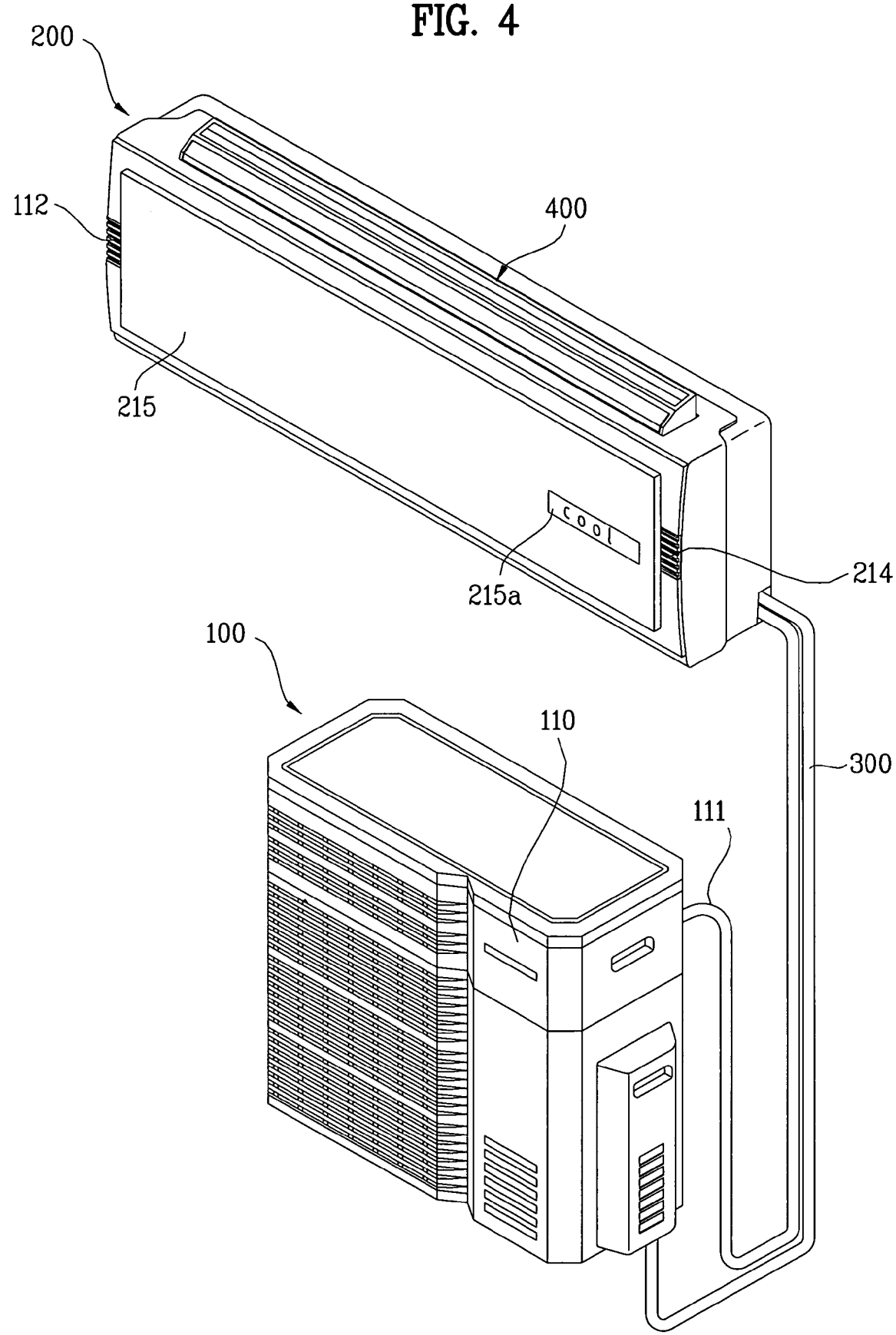
FIG. 4 illustrates a perspective view showing the air conditioner of FIG. 3 in a stopping state.
Figure 5:
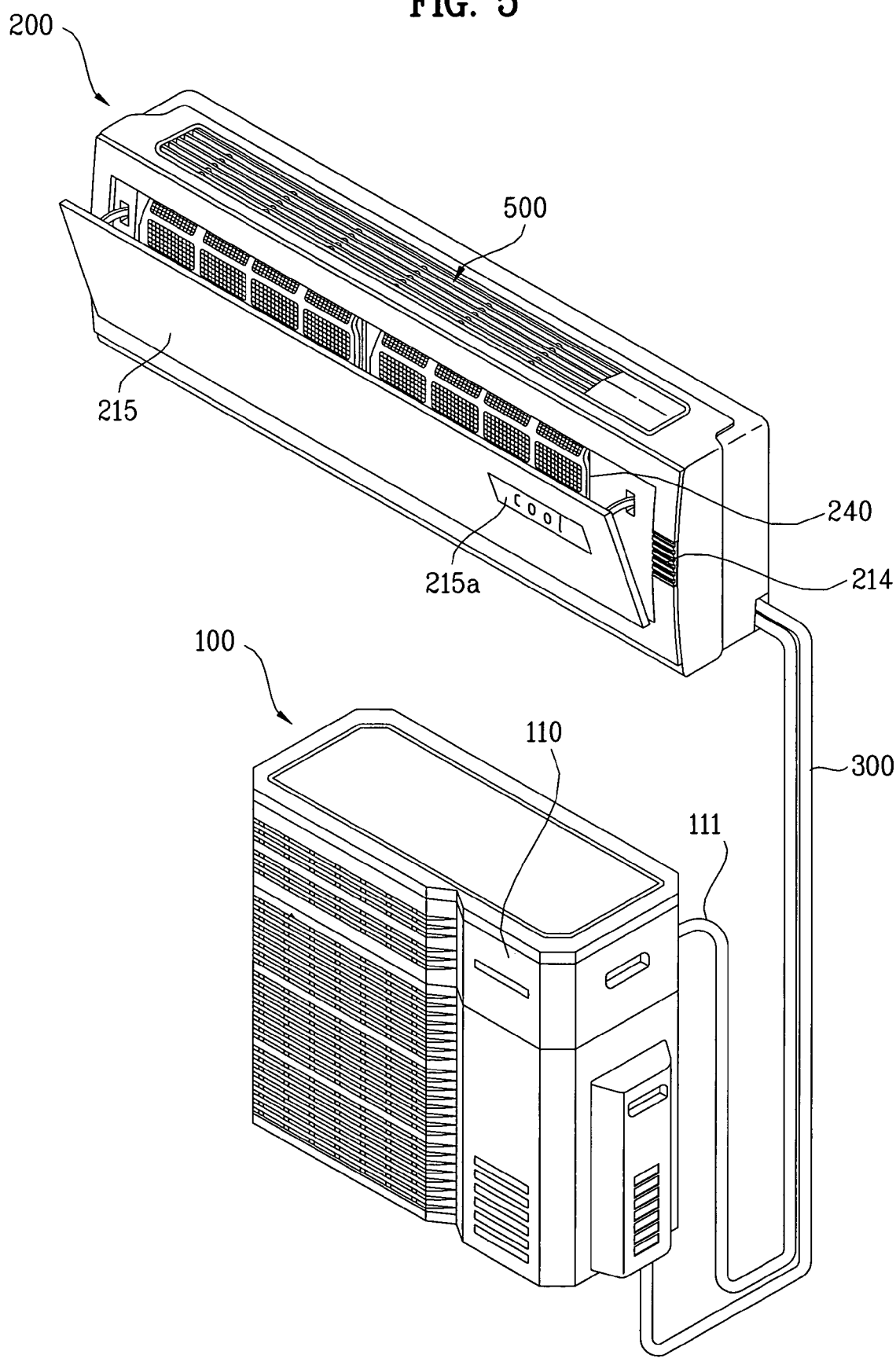
FIG. 5 illustrates showing a perspective view showing the air conditioner with a suction grill in accordance with the present invention.
Figure 6:
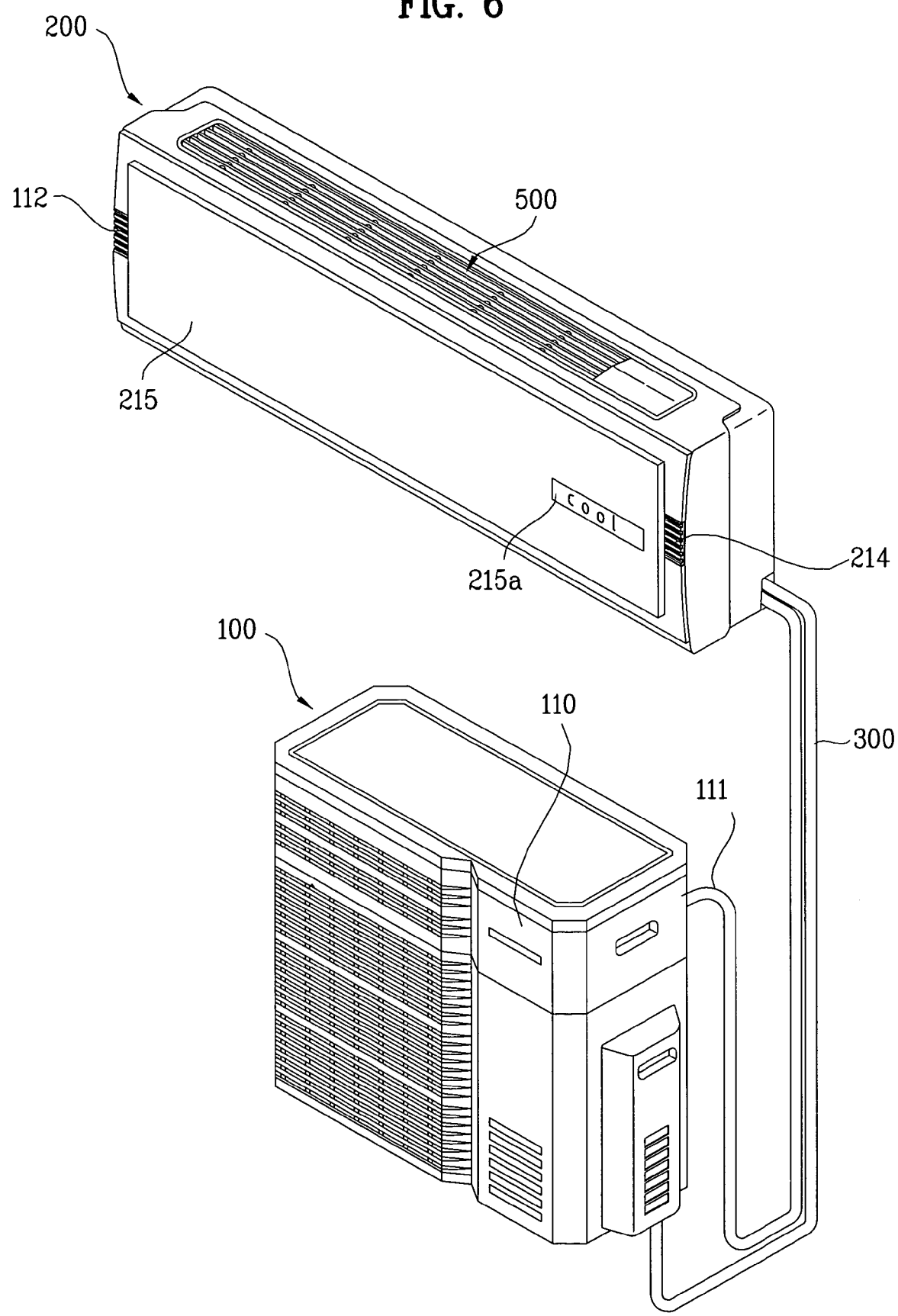
FIG. 6 illustrates a perspective view showing the air conditioner of FIG. 5 in a stopping state.
Figure 7:
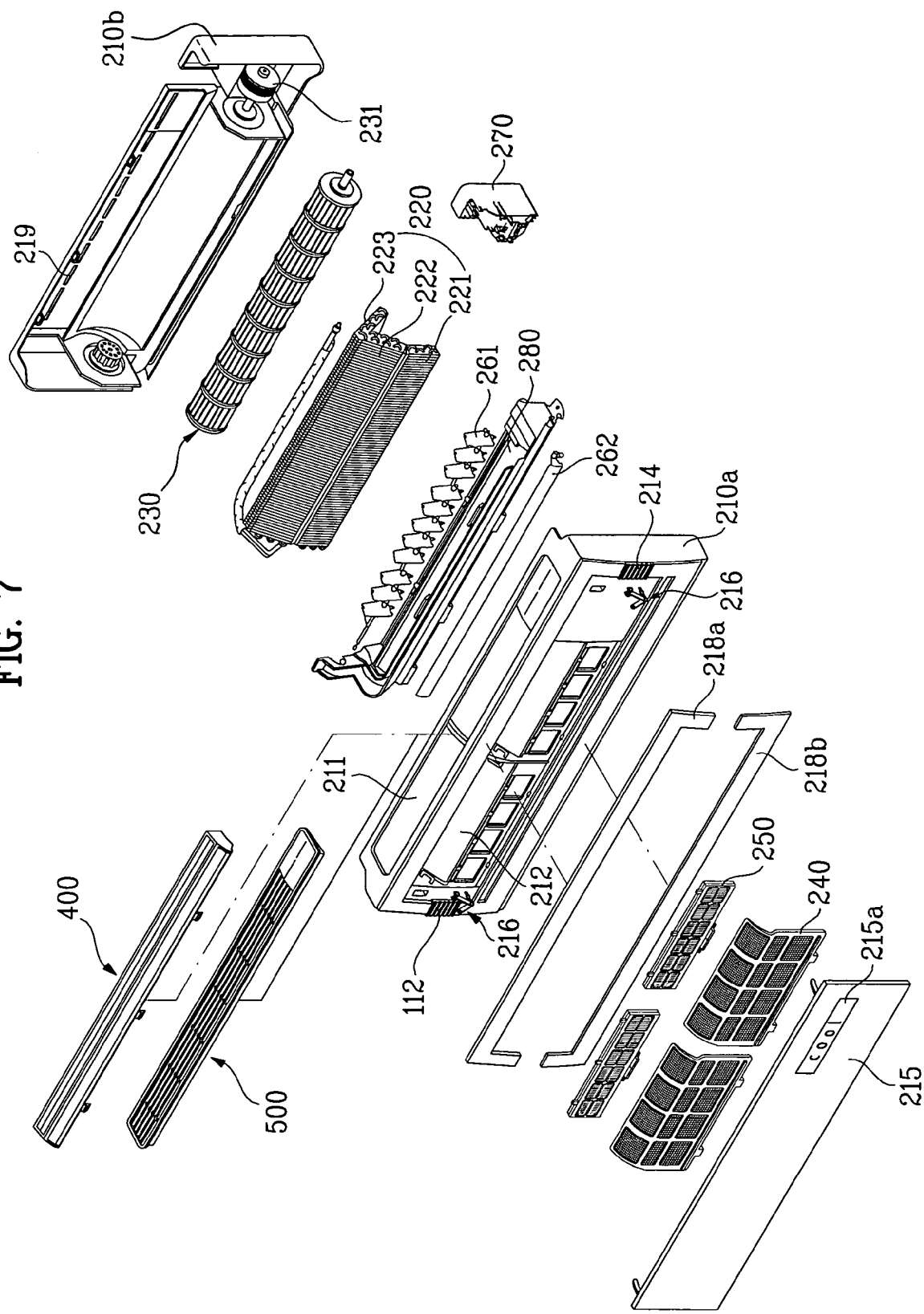
FIG. 7 illustrates a perspective view showing a first embodiment of an indoor unit provided at the air conditioner in accordance with the present invention.

FIG. 3 illustrates a perspective view showing an embodiment of an air conditioner with a filter unit in accordance with the present invention. FIG. 4 illustrates a perspective view showing the air conditioner of FIG. 3 in a stopping state. FIG. 5 illustrates showing a perspective view showing the air conditioner with a suction grill in accordance with the present invention. FIG. 6 illustrates a perspective view showing the air conditioner of FIG. 5 in a stopping state. FIG. 7 illustrates a perspective view showing a first embodiment of an indoor unit provided at the air conditioner in accordance with the present invention.

Figure 8:
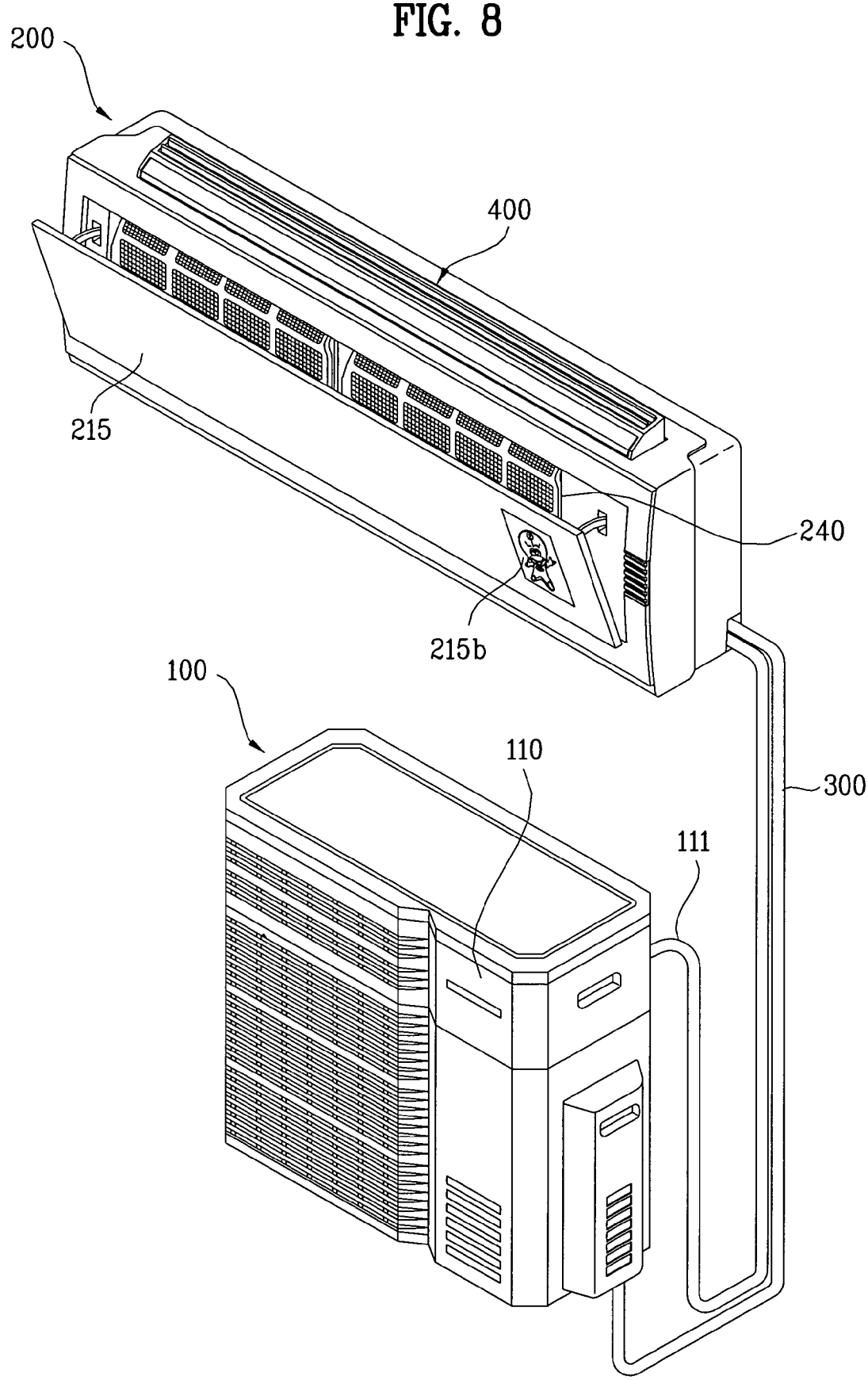
FIG. 8 illustrates a perspective view showing a second embodiment of an air conditioner having a filter unit in accordance with the present invention.
Figure 9:
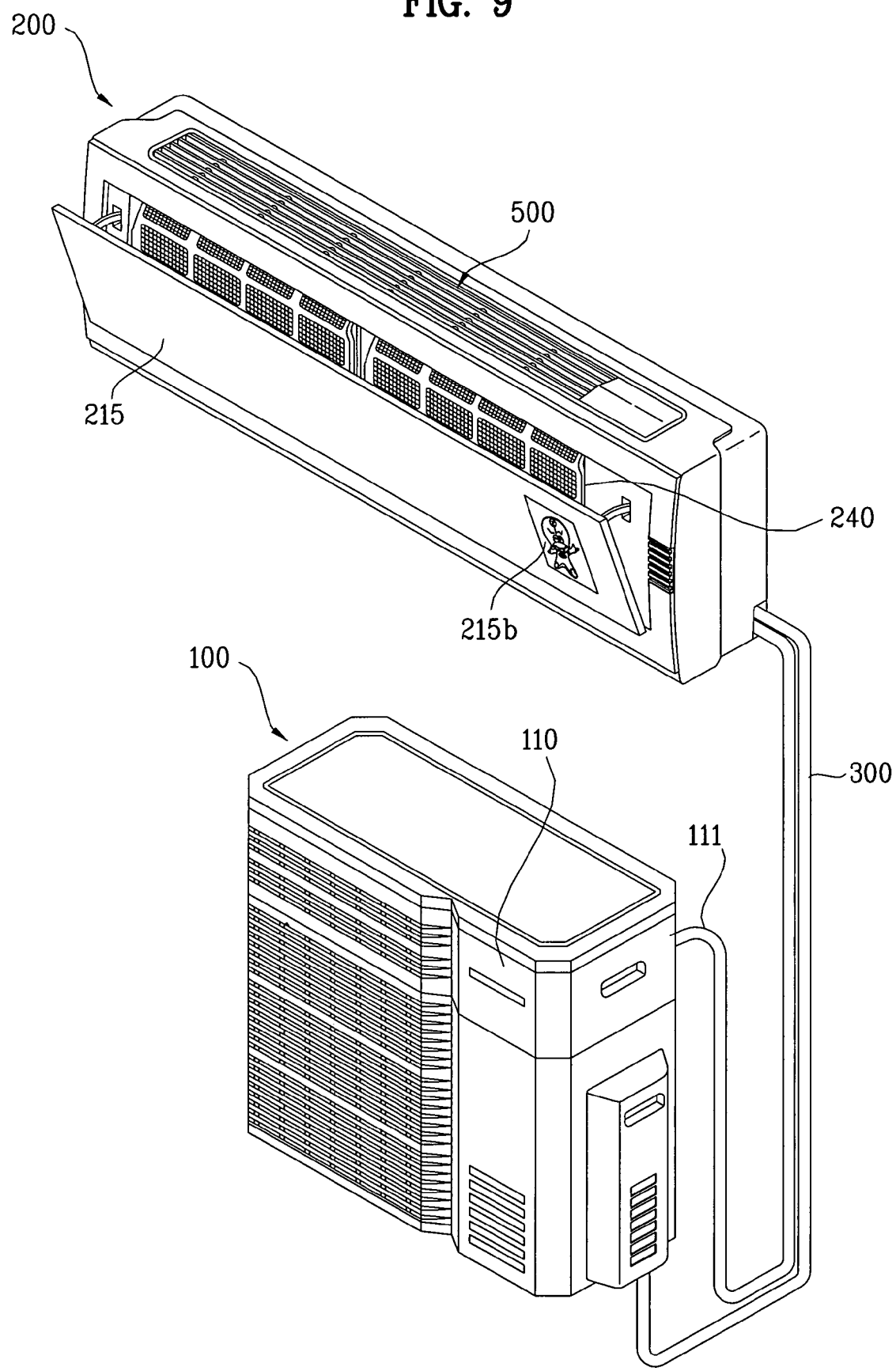
FIG. 9 illustrates a perspective view showing a second embodiment of the air conditioner with the suction grill in accordance with the present invention.
Figure 10:
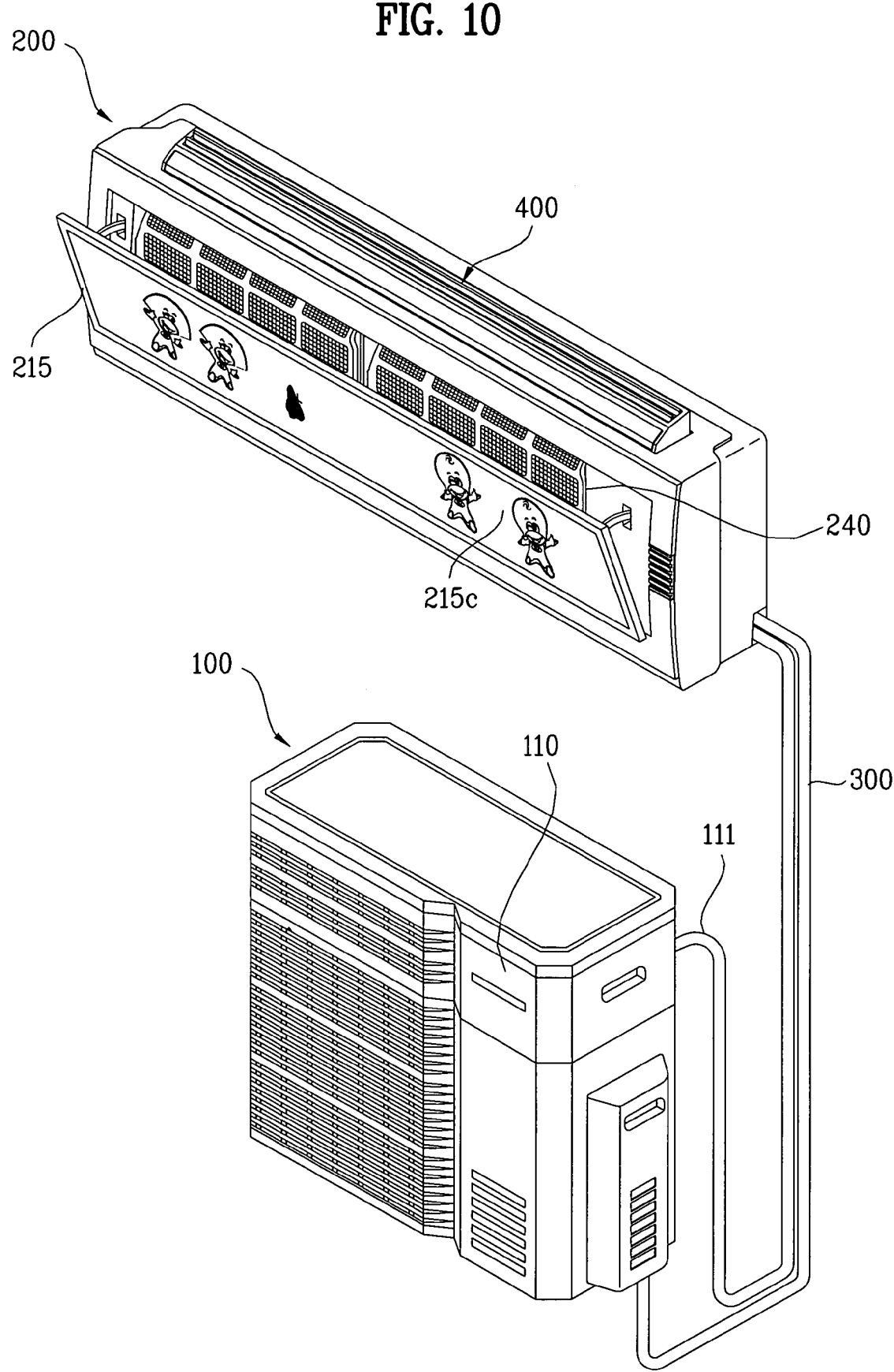
FIG. 10 illustrates a perspective view showing a third embodiment of the air conditioner with the filter unit in accordance with the present invention.
Figure 11:
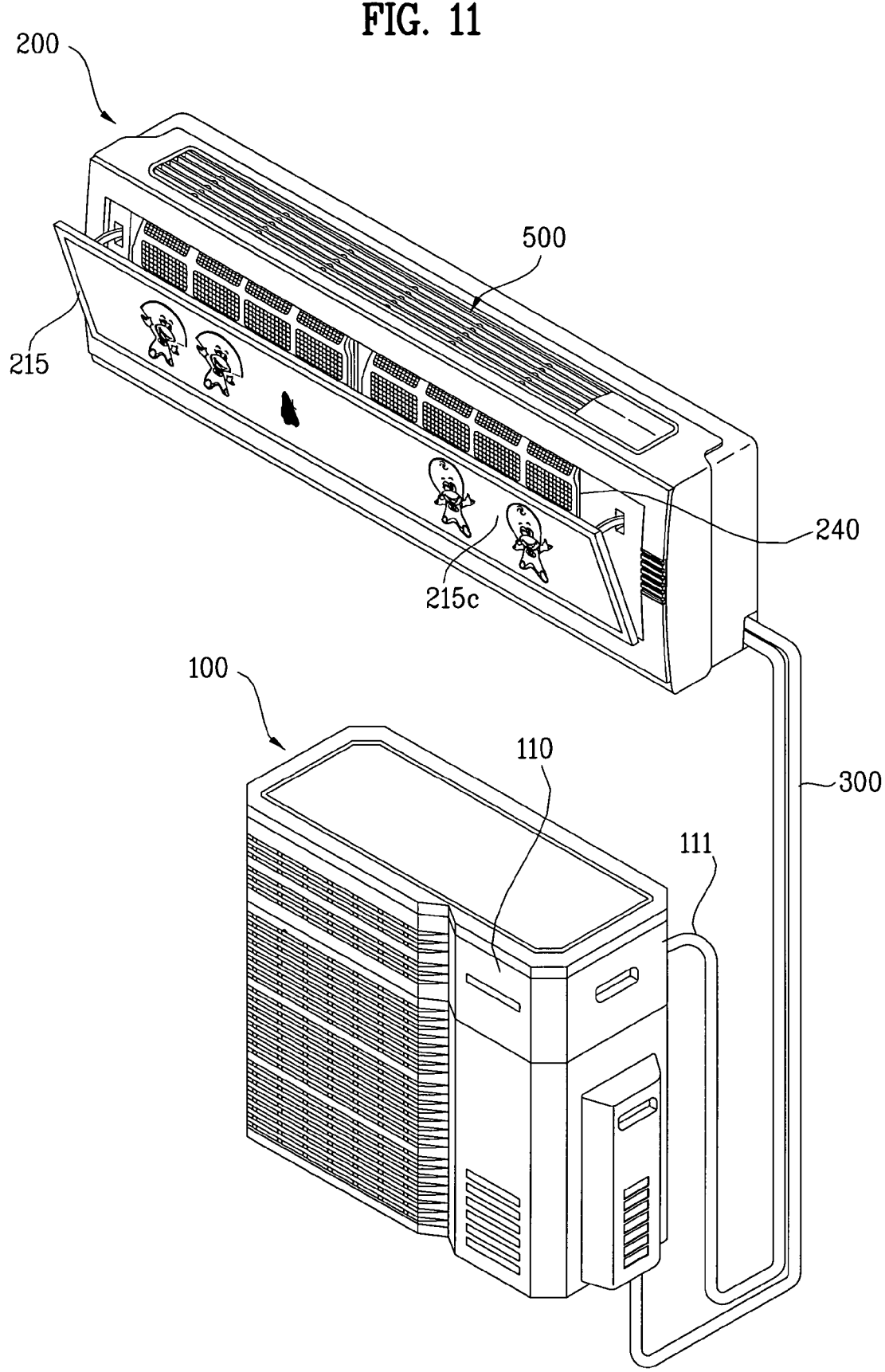
FIG. 11 illustrates a perspective view showing a third embodiment of the air conditioner with the suction grill in accordance with the present invention.

FIG. 8 illustrates a perspective view showing a second embodiment of an air conditioner having a filter unit in accordance with the present invention. FIG. 9 illustrates a perspective view showing a second embodiment of the air conditioner with the suction grill in accordance with the present invention. FIG. 10 illustrates a perspective view showing a third embodiment of the air conditioner with the filter unit in accordance with the present invention. FIG. 11 illustrates a perspective view showing a third embodiment of the air conditioner with the suction grill in accordance with the present invention.

Referring to FIGS. 3 to 7, the air conditioner in accordance with the present invention includes an outdoor unit 100 provided at outside, an indoor unit 200 provided in the room and cooling/heating the room, and a refrigerant pipe connecting the outdoor unit 100 with the indoor unit 200.

The indoor unit 200 is provided with an outdoor heat exchanger (not shown) for heat exchanging with the outdoor air drawn into the outdoor unit, a compressor (not shown) for compressing and discharging the refrigerant, and an expander (not shown) for expanding the refrigerant, and an oxygen generator 110 or a humid air generator (not shown) is provided at a side of the outdoor unit 100.

The oxygen generator 110 being an apparatus for generating fresh oxygen is connected with the indoor unit 200 via an oxygen supply pipe 111.

Accordingly, the oxygen generated from the oxygen generator 110 is supplied to the indoor unit 200 through the oxygen supply pipe 111, and the oxygen supplied to the indoor unit 200 is supplied to the room through an oxygen discharge hole 112 provided on a front surface of the indoor unit 200.

As a first embodiment of an indoor unit having the filter unit in accordance with the present invention, a wall mounting type indoor unit 200 among indoor units of a separate type air conditioner will be described hereunder.

The indoor unit 200 includes a cabinet 210 having at least one air inlet and at least one air outlet and having a predetermined space formed therein, an indoor heat exchanger 220 provided in the cabinet, and a fan 230 provided in the cabinet and forcing air movement.

A first air inlet 211 for drawing in the air from outside of the cabinet, i.e., the room air is provided on an upper surface of the cabinet, and a second air inlet 212 for drawing in the room air is provided on a front surface of the cabinet 210.

In this case, a filter unit 400 or a suction grill 500 for purifying the air is selectively provided at the first air inlet 211. When the room air is heavily polluted or a user wants more fresh air, the filter unit 400 being provided at the cabinet 210 of the indoor unit draws in the room air to purify the room air and then supplies the purified air to the cabinet 210 of the indoor unit.

The suction grill 500 being provided at the cabinet 210 of the indoor unit prevents large impurities from being entered into the cabinet 210 and protects parts accommodated in the cabinet when a pollution level of the room air is low.

An air outlet 213 for discharging conditioned air, i.e., cooled/heated air is provided at a lower part of the cabinet 210. In this case, it is desirable that the air outlet 213 is provided on a bottom surface of the cabinet 210 so as to discharge air directly to under the cabinet 210. In more detail, the cabinet 210 includes a front cabinet 210a having an opened rear portion, and a rear cabinet 210b having an opened front portion.

The first air inlet 211 is provided on a top surface of the cabinet 210a, and the second air inlet 212 is provided on a front surface thereof, and the air outlet 213 is provided on a bottom surface thereof.

The oxygen discharge hole 112 is provided on a left side of the front edge of the front cabinet 210a, and an operation controller 214 is provided on a right side thereof, the operation controller 214 for controlling the operation of the indoor unit 200 and displaying the operation information of the air conditioner. The locations of the oxygen discharge hole 112 and the operation controller 214 can be switched to each other.

In this case, the operation controller 214 includes a printed circuit board, a plurality of LEDs soldered in the printed circuit board, and a diffusion board provided in front of the LEDs and diffusing the lights of the LEDs. A switch (not shown) provided at the rear of the operation controller 214 is in contact with the printed circuit board so as to input the operation information of the air conditioner.

A front filter 240 for filtering impurities contained in the air drawn in through the second air inlet 212 is provided at a front portion of the front cabinet 210a, and an electric dust collector 250 for ionizing and collecting the impurities contained in the air drawn in through the second air inlet 212 is provided at a rear portion of the front filter 240.

A front panel 215 for opening/closing the second air inlet 212 is provided on a front surface of the front cabinet 210a, and a display member 215a including an LCD or LED for displaying the operation information of the air conditioner is provided on a front side of the front panel 215.

In this case, the front panel 215 may be provided with a mirror, a color panel, or a frame. The front panel 215 is rotatably provided to rotate frontward around a lower part of the front panel so as to open/close the second air inlet 212 according to the operation of the indoor unit.

In other words, the front panel 215 is configured to open the second air inlet 212 during the operation of the indoor unit 200 and to close the second air inlet 212 during the stoppage of the indoor unit. The front panel 215 is configured to locate at a front lower part of the cabinet 210 when the front filter 240 is placed or withdrawn.

For this reason, the front panel 215 is connected to the front cabinet 210 via a link member 216. The link member 216 includes a first link 216a rotatably connected to a lower part on a front surface of the front cabinet 210, and a second link 216b having a first end rotatably connected to a second end of the first link 216a and a second end rotatably connected to a lower rear surface of the front panel 215.

In this case, the first end of the first link 216a is hinge coupled with the front cabinet 210a and a second end thereof slants downward and extends. A fixing member 216c is protruded from a lower part of the first end of the first link 216a to a front thereof so as to selectively fix the second end of the first link 216a. In other words, the fixing member 216c fixes the second end of the first link 216a when the front panel 215 is rotated for opening/closing the second air inlet 212.

When the front filter is placed or withdrawn, the first link 216a is released from the second end so as to completely open the front panel 215, and thereby to locate the front panel 215 at a front lower part of the cabinet 210.

A pinion 217a for rotating the front panel 215 is provided at an upper part of the front cabinet 210, and a rack 217b meshed with the pinion 217a is protruded rearward from an upper rear surface of the front panel 215. In this case, it is desirable that the pinion 217a is rotated through a motor and the rack 217b is formed in an arc shape.

In addition, a top decorative panel 218a and a bottom decorative panel 218b are provided at a front edge of the front cabinet 210 except a portion having the oxygen discharge hole 112 and the operation controller 214 formed thereon.

It is desirable that a third air inlet 219 is provided at a rear upper part of the rear cabinet 210b so as to minimize air suction resistance. At least one louver 261 for controlling a left/right direction of the air discharged through the air outlet is rotatbly provided at an inner lower part of the front cabinet 210a, and a vein 262 for controlling an up/down direction of the air discharged through the air outlet 213 is rotatably provided at the air outlet 213.

The fan 230 forces air movement such that the room air is drawn in through the first air inlet 211, the second air inlet 212 and the third air inlet 219 of the cabinet 210. A heat exchange is then carried out and the air is discharged through the air outlet 213 to the room.

In this case, the fan 230 includes a cross flow fan driven by the motor 231, and provided to be long in the left/right direction on the inside of the rear cabinet 210b, and a control box 270 for controlling the operation of the air conditioner in accordance with the present invention is provided at a front side of the motor 231 for rotating the fan 230.

The heat exchanger 220 is provided between the air inlets 211, 212, 219 of the cabinet and the fan 230 so as to cool/heat the air drawn in through the air inlets 211, 212, 219 of the cabinet.

The heat exchanger 220 includes a vertical member 221 vertically provided at a rear of the second air inlet 212, a first sloping member inclined toward the rear from an upper end of the vertical member 221, and a second sloping member 223 declined toward the rear from the upper end of the first sloping member 222.

In this case, the vertical member 221 exchanges heat mainly with the air drawn in from the second air inlet 212, the first sloping member 222 mainly with the air drawn in from the first air inlet 211, and the second sloping member 223 mainly with the air drawn in from the third air inlet 219.

A condensed water reservoir 280 is provided at an inner lower part of the front cabinet 210, preferably, at a lower part of the vertical member 221 of the indoor heat exchanger 221.

Meanwhile, referring to FIGS. 8 and 9, a second embodiment of an air conditioner with a display member 215b is illustrated, the display member 215b for displaying the operation information via avatar at a side of the front panel 215.

Referring to FIGS. 10 and 11, a third embodiment of the air conditioner with the display member 215c is illustrated, the display member 215c displaying the operation information via a plurality of Avatars on a whole front surface of the front panel 215.

In the air conditioner illustrated in FIG. 8 to FIG. 11, since other structural elements are the same as stated above except the structural elements of each display member 215b and 215c, identical parts will be given the same names and reference symbols, and repetitive description of which will be omitted.

Figure 12:
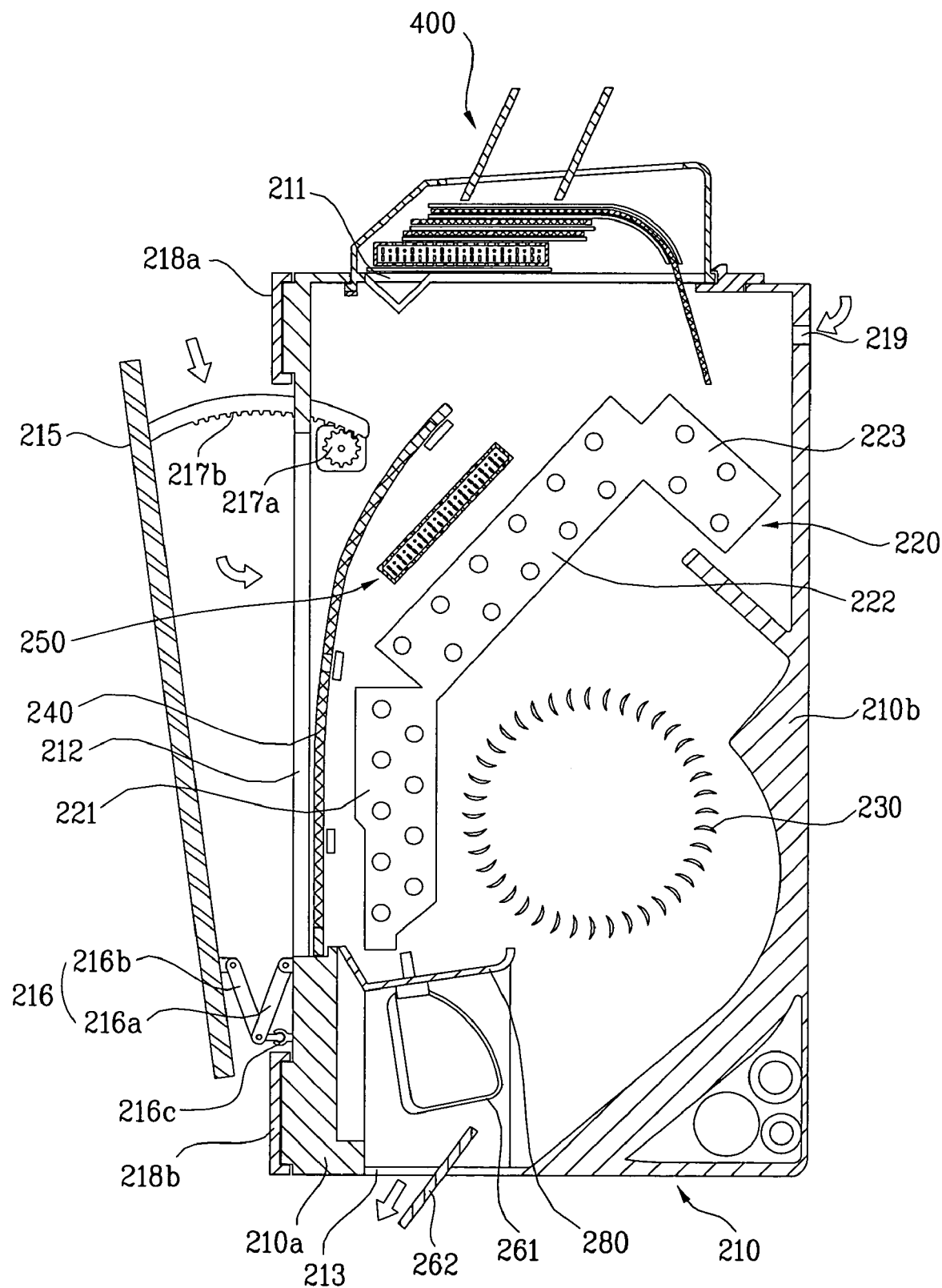
FIG. 12 illustrates a cross sectional view showing an indoor unit of the air conditioner in accordance with the present invention, with a first embodiment of the filter unit.
Figure 13:
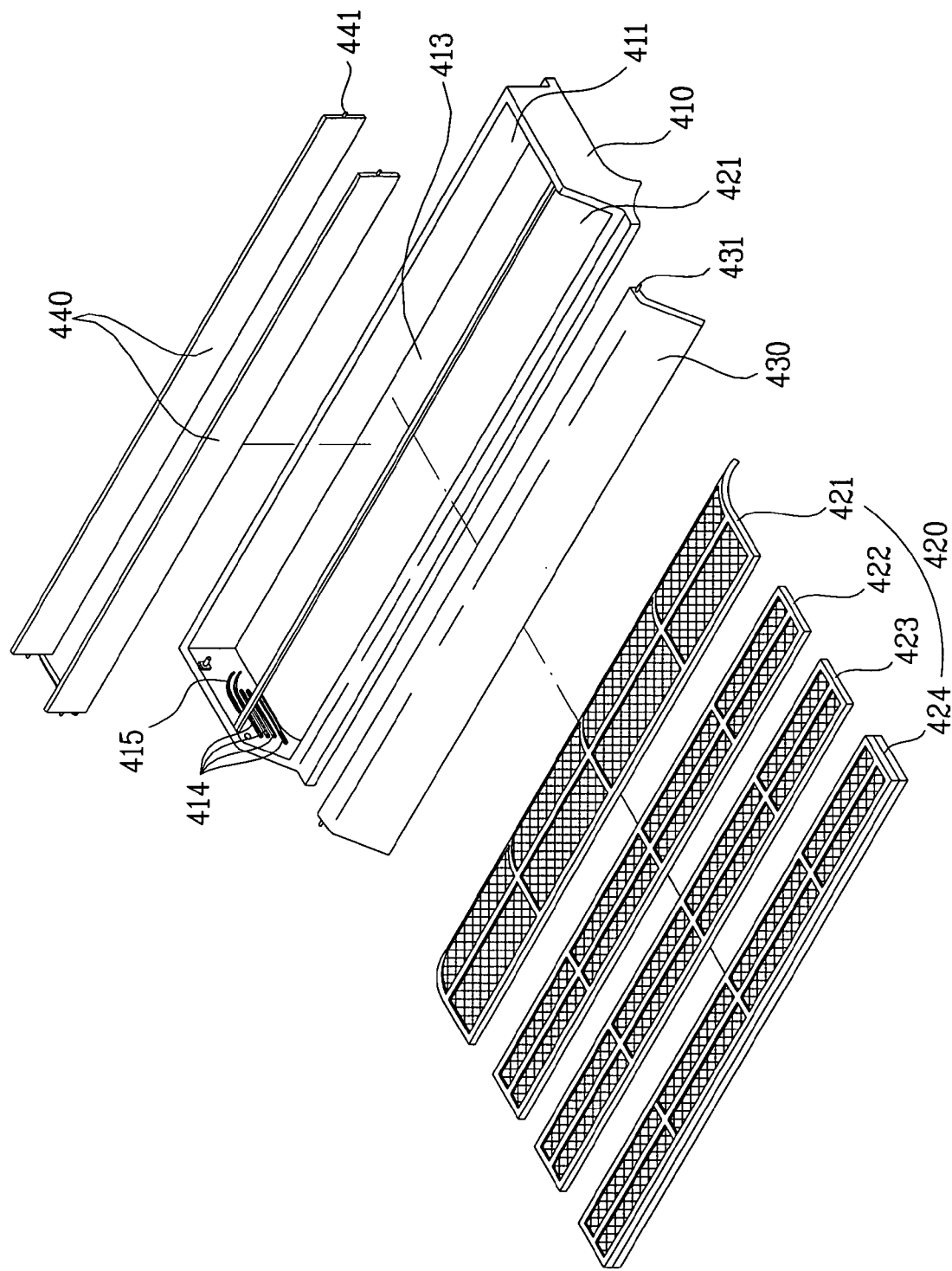
FIG. 13 illustrates a schematic perspective view showing the first embodiment of the filter unit provided at the air conditioner in accordance with the present invention.
Figure 14:
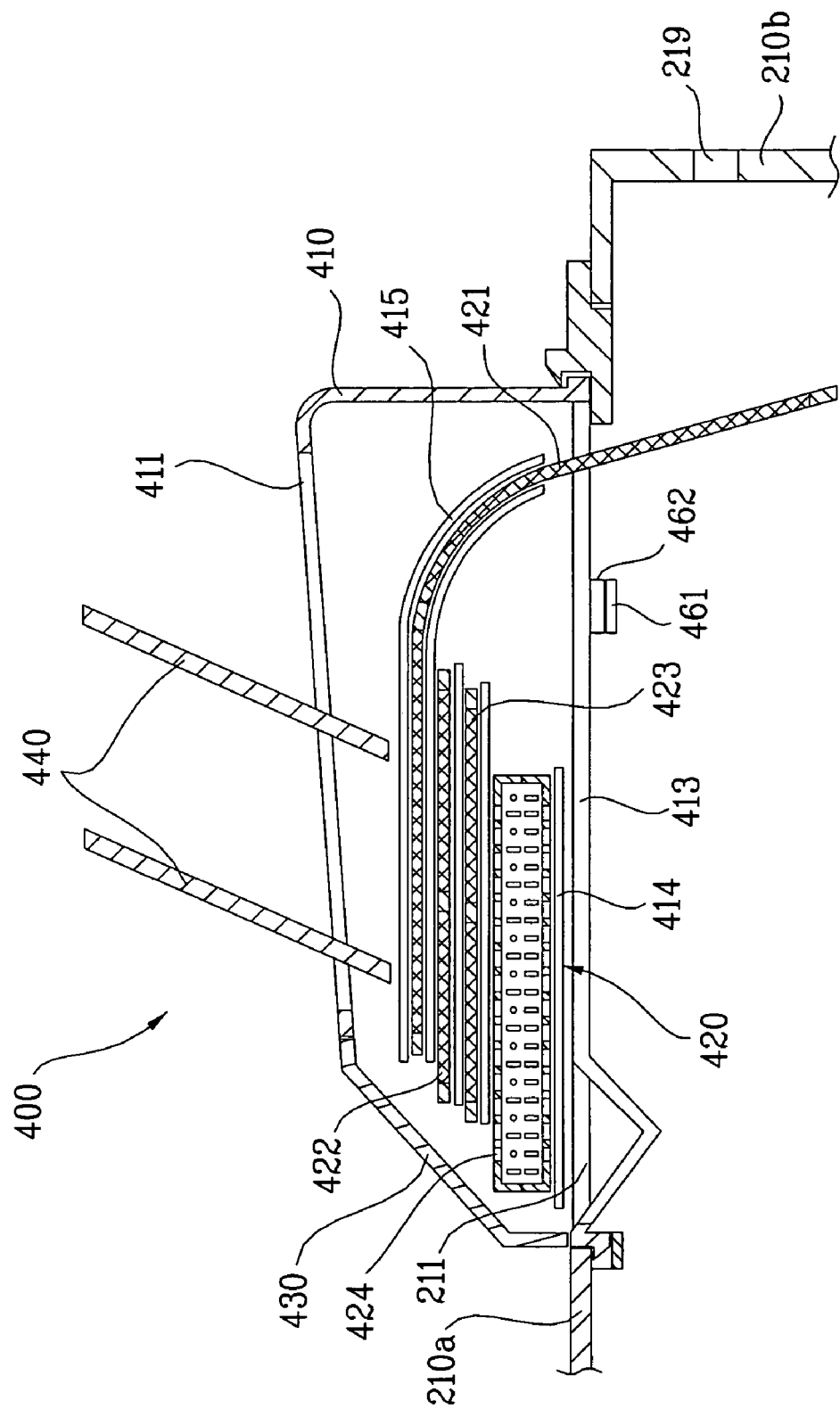
FIG. 14 illustrates a cross sectional view showing the first embodiment of the filter unit provided at the air conditioner in accordance with the present invention, in an operating state.
Figure 15:
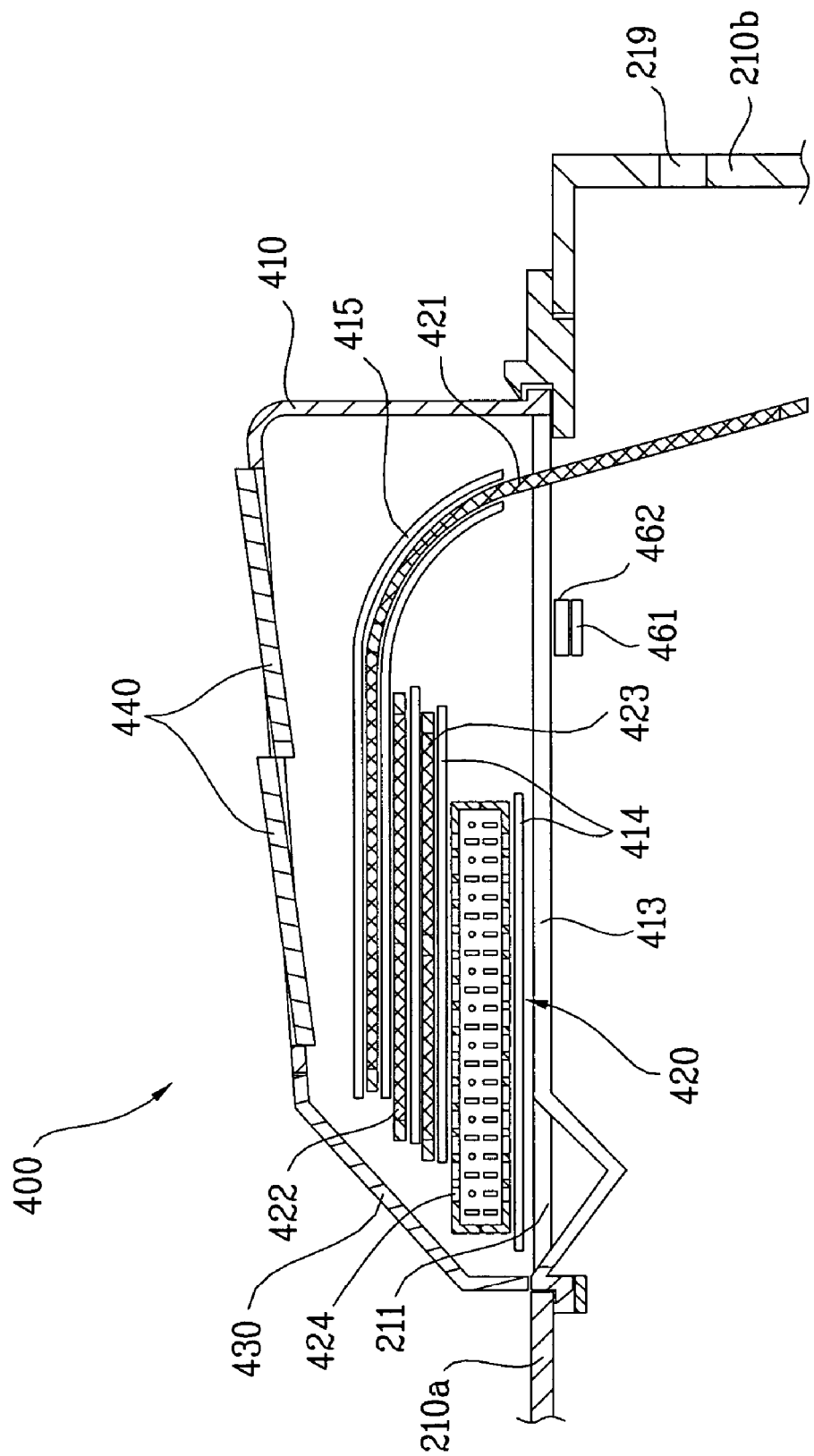
FIG. 15 illustrates a cross sectional view showing the first embodiment of the filter unit provided at the air conditioner in accordance with the present invention, in a stopping state.

The first embodiment of the filter unit 400 provided at the air conditioner in accordance with the present invention will be described referring to FIGS. 12 to 15. FIG. 12 illustrates a cross sectional view showing an indoor unit of the air conditioner in accordance with the present invention, with a first embodiment of the filter unit. FIG. 13 illustrates a schematic perspective view showing the first embodiment of the filter unit provided at the air conditioner in accordance with the present invention. FIG. 14 illustrates a cross sectional view showing the first embodiment of the filter unit provided at the air conditioner in accordance with the present invention, in an operating state. FIG. 15 illustrates a cross sectional view showing the first embodiment of the filter unit provided at the air conditioner in accordance with the present invention, in a stopping state.

Referring to FIGS. 12 to 15, the filter unit 400 includes a filter case 410 provided on an outer surface, particularly, on an upper surface of the cabinet, and a filter member 420 accommodated in the filter case 410 and purifying the air.

The filter case 410 is mounted on an edge of the first air inlet 211 by a hook or other coupling means. The filter case 410 includes an air inlet 411 for drawing in the room air, a filter gate 412 for placing/withdrawing the filter member 420, and a purified air outlet 413 for discharging purified air from the filter member 420.

The air inlet 411 is provided on an upper surface of the filter case 410, and at least one louver 440 for opening/closing the air inlet 411 is provided at the filter case 410.

The louver 440 is rotatably connected to an edge of the air inlet 411. In more detail, a pivot 441 is protruded from each of the both ends of the louver 440, respectively, and a hole (not shown) for accommodating the pivot is provided on both inner walls of the edge of the air inlet 411, respectively. One of the pivots of the louver 440 is connected to a louver use motor (not shown), and the louver 440 is automatically opened/closed during the operation of the air conditioner.

The louver 440 structured as mentioned above not only guides the room air to the filter member 420, the room air drawn in through the air inlet 411 but also closes the air inlet 411 so as to prevent the impurities from being entered into the filter case 410 when the air conditioner is stopped for a long time.

The filter gate 412 is provided at a front portion of the filter case 410 and opened/closed by a cover 430 rotatably provided at the filter case. In this case, the cover 430 is provided to be rotatable around an upper end thereof. For this reason, a pivot 430 protruded sideward is provided at an upper end of each side of the cover 430, and a hole (not shown) to which each of the pivot 431 is inserted is formed on both inner walls of the edge of the filter gate 412. The purified air outlet 413 is provided at the bottom of the filter case 410 and is communicated with the first air inlet 211 of the cabinet.

In the mean time, the filter member 420 accommodated in the filter case 410 includes at least one filter. In more detail, the filter member 420 includes a first filter provided at a lower part of the air inlet 411, a nano copper filter 422 provided at a lower part of the first filter 421, a nano silver filter 423 provided at a lower part of the nano copper filter 422, and an electric dust collector 424 provided at a lower part of the nano silver filter 423 so as to ionize and collect the impurities. In other words, it is desirable that the filter member 420 includes a plurality of filters formed in layers such that the air drawn in through the air inlet 411 of the filter unit moves to the purified air inlet 413 provided at the bottom of the filter case and passes each of the filters 421, 422, 423, and 424 in order.

In this case, it is desirable that at least one of the filters 421, 422, 423, and 424 is extended toward a third air inlet 219 of the cabinet so as to purify the air drawn in through the third air inlet 219 of the cabinet. In the present invention, the first filter 421 is extended to the third air inlet 219 of the cabinet.

The filter member 420 may of course further include the nano carbon filter and a hepa filter, and the arrangement of the filters is not limited to the arrangement mentioned above.

Meanwhile, a placement/withdrawal guide for guiding withdrawal of the filter member 420 is provided on an inner wall of the filter case 410. In this embodiment, the filters 421, 422, 423, and 424 are slid into or out of the front portion of the filter case so as to be placed or withdrawn. For this reason, the placement/withdrawal guide includes a plurality of ribs 413 protruded from both inner walls of the filter case and supporting the lower parts on both ends of each of the filters.

In this case, each of the ribs 414 supports both lower ends of each of the filters 421, 422, 423, and 424, prevents other filters provided at a lower part of the filter supporting each of the ribs 414 from escaping upward, and guides the filter to be placed or withdrawn.

For example, the rib supporting the first filter 421 prevents the nano copper filter 422 provided at the lower part of the first filter 421 and guides the nano copper filter 422 to be placed or withdrawn.

It is desirable that the placement/withdrawal guide further includes an auxiliary rib 414b at an upper part of the rib supporting the lower parts of both ends of the first filter 421.

Accordingly, the filters are placed or withdrawn to the filter case in a drawer manner. In addition, it is desirable that the auxiliary rib 414b and a rib 414 supporting the upper and lower ends on both sides of the first filter 421, respectively, are extended to the third air inlet 210 of the cabinet so as to support the rear portion of the first filter extended to the third air inlet 219 of the cabinet.

To supply electric power to the filter unit 400 structured as mentioned above, a power source supplying substrate 461 is provided at the cabinet 210, and a power source applying substrate 462 is provided at the filter case 410, the power source applying substrate 462 coming into contact with the power source supplying substrate 461 during the installation of the filter unit 400.

Figure 16:
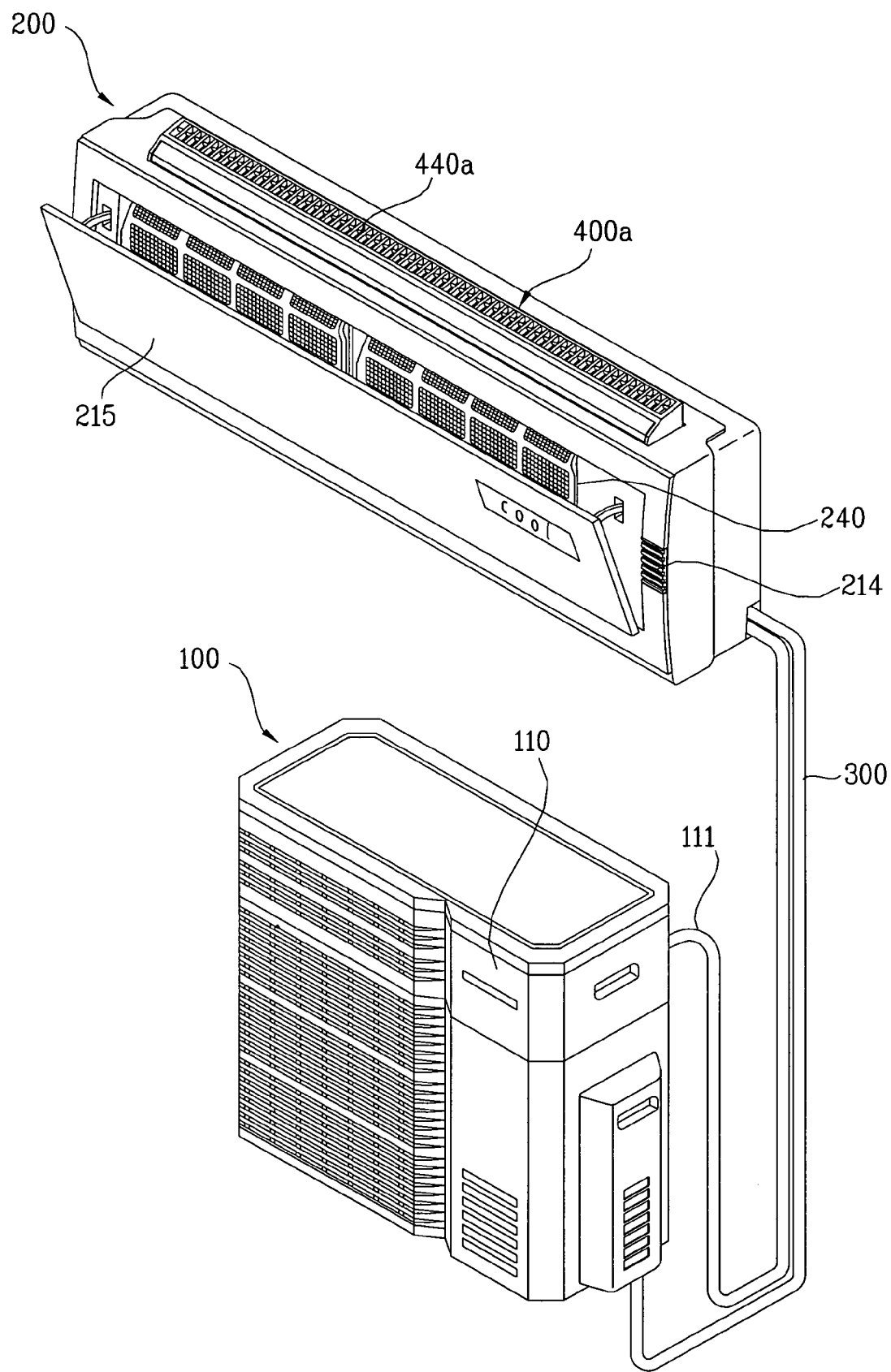
FIG. 16 illustrates a perspective view showing the air conditioner in accordance with the present invention, with the second embodiment of the filter unit.

Meanwhile, instead of the louver 440, a grill 440a having a plurality of through holes may be provided at the air inlet 411 of the filter unit. FIG. 16 illustrates the air conditioner including the second embodiment of the filter unit 400a having the air inlet 411 with the grill 440a. Other structural elements except the grill 440a are the same as aforementioned, therefore a description of which will be omitted.

Figure 17:
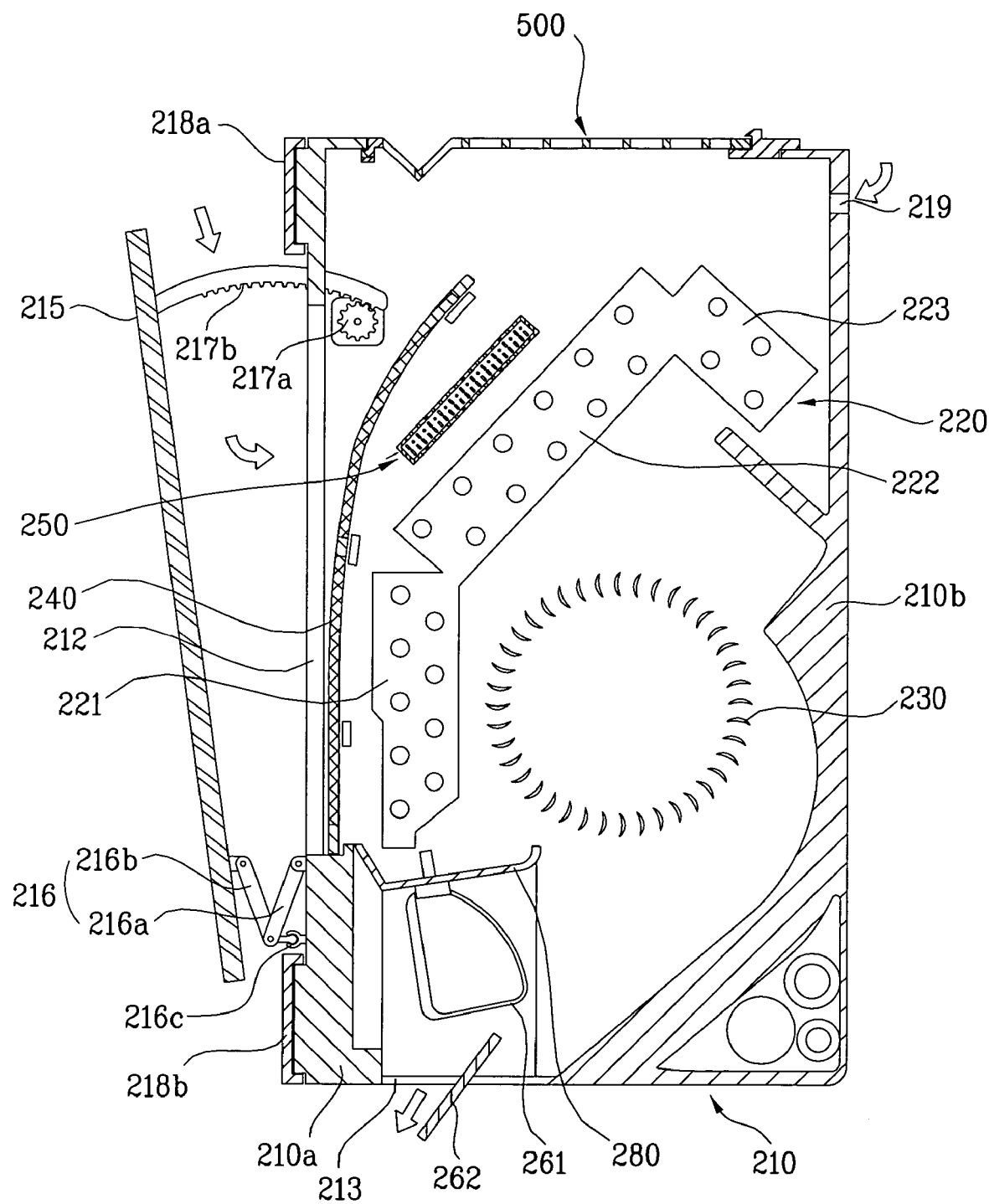
FIG. 17 illustrates a cross sectional view showing the indoor unit of the air conditioner in accordance with the present invention, with the first embodiment of the suction grill.

Referring to FIG. 17, the first embodiment of a suction grill 500 provided at the indoor unit 200 of the air conditioner in accordance with the present invention will be described hereunder.

The suction grill 500 includes the plurality of pass through holes passing in an up and down direction, and the edge of the suction grill 500 is detachably provided to the edge of the air inlet 211 of the cabinet.

The function of the air conditioner in accordance with the present invention will be described as follows, the air conditioner selectively including the filter units 400 and 400a or the suction grill 500.

First of all, when the room air is heavily polluted or a user wants fresher air, the filter unit 400 and 400a are provided at the first air inlet 211 of the indoor unit.

When the power source is supplied to the air conditioner and the air conditioner starts to operate, a front panel 215 of the cabinet is rotated frontward so as to open the second air inlet 212 of the cabinet, and a vein 262 of the cabinet opens the air outlet 213 of the cabinet. Then a louver 434 of the filter unit 400 is rotated so as to open the filter unit.

When the second air inlet 212 of the cabinet and an air inlet 433 of the filter unit are opened, the fan 230 of the cabinet is rotated, and a compressor of the outdoor unit 100 and so on is operated so as to circulate the refrigerant.

Accordingly, the room air is drawn into the cabinet through the second air inlet 212 and the third air inlet 219 of the cabinet, and into the filter case 410 through the air inlet 411 of the filter unit 400.

In this case, the air drawn into the second air inlet 212 of the cabinet is purified at the front filter 240 of the cabinet and the electric dust collector 250, and the air drawn in through the third air inlet 219 is purified at the rear portion of the first filter 421 of the filter member 420, cooled/heated by the heat exchanger 400, and discharged to the room through the air outlet 213 of the cabinet.

In the process of discharging the air, the air is controlled to be discharged in left/right direction and up/down direction by the louver 261 and the vein 262 provided at the air outlet 213 of the cabinet.

In the mean time, the room air drawn into the filter unit 400 is purified sequentially passing through the filters of the filter member and passed through the purified air outlet 412 of the filter unit and the first air inlet 211 of the cabinet so as to be supplied to the cabinet 210.

The purified air passed through the first air inlet 211 and supplied to the cabinet 210 is cooled/heated in the heat exchanger 220, and then discharged through the air outlet 213 of the cabinet.

In more detailed description of the air purifying function via the filter member 420 of the filter unit, the room air drawn into the filter case 410 sequentially passes through the first filter 421, the nano copper filter 422, the nano silver filter 423, and the electric dust collector 424, and the impurities such as dust contained in the room air is filtered and sterilized, and the impurities such as dust particles are ionized and collected.

For this reason, a user opens the cover 430 of the filter unit and opens the filter gate 412 and draws out the filters from the filter case 410 frontward. The filters drawn out are cleaned and placed back to the filter case 410, or replaced with the new filters.

In the process of placing/withdrawing the filters 421, 422, 423, and 424, the rib 414 and the auxiliary rib 415 provided on the inner wall of the filter case guide to smoothly place/withdraw the filters.

The air conditioner may be operated in the air puffing mode so as to perform only the air purification function. When the air conditioner is used in the air purifying mode, the compressor is not operated and the heat exchange via the indoor heat exchanger 220 is not carried out, but only the air purifying function is carried out.

In this case, the front panel 215 of the cabinet is opened or closed according to strength and weakness of thee air purifying mode, i.e., rise and fall of the amount of the air circulation.

In the mean time, when the pollution level of the room air is mild, or when the filter units 400 and 400a are provided at the indoor unit 200, and the room is purified more than a predetermined level, the filter units 400 and 400a provided at the first air inlet 211 of the cabinet are separated, and the suction grill is provided.

In the operating process of the air conditioner having the suction grill 500 provided at the first air inlet 211 of the cabinet, the air suction resistance is remarkably reduced compared to the case that the filter units 400 and 400a are provided thereat. Therefore, the air conditioner can be economically operated.

Figure 18:
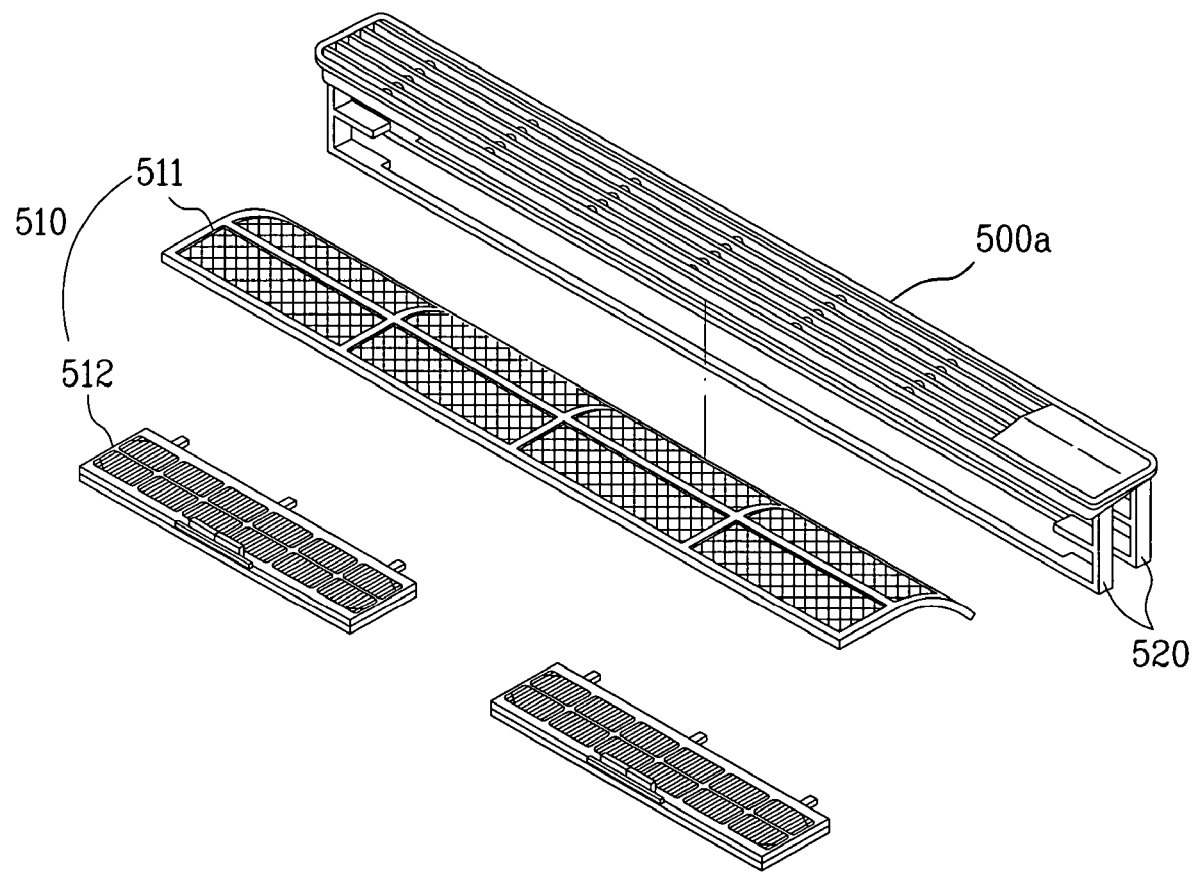
FIG. 18 illustrates a schematic perspective view showing a second embodiment of the suction grill provided at the air conditioner in accordance with the present invention.
Figure 19:
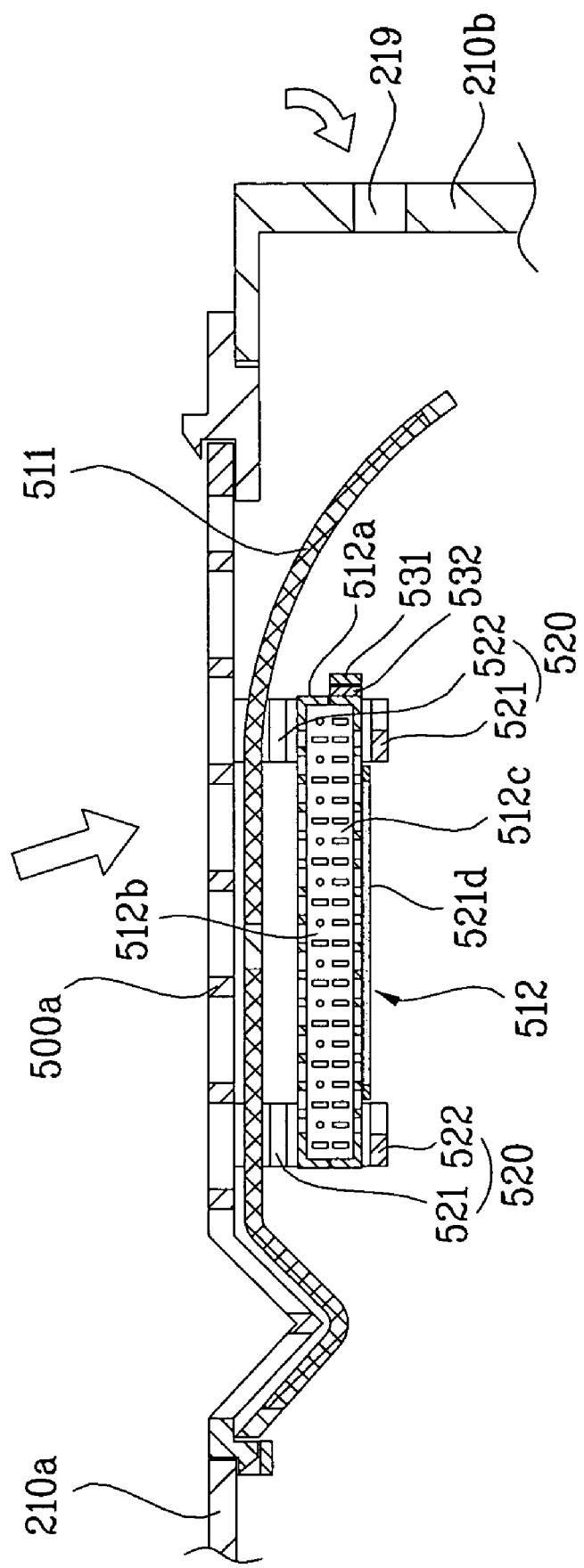
FIG. 19 illustrates a cross sectional view showing the suction grill of FIG. 18.

The rest processes are the same as the case that the filter units 400 and 400a are provided, therefore, repetitive description of which will be omitted. Referring to FIGS. 18 and 19, the second embodiment of the suction grill provided at the air conditioner in accordance with the present invention will be described hereunder.

FIG. 18 illustrates a perspective view schematically showing a second embodiment of the suction grill provided at the air conditioner in accordance with the present invention, and FIG. 19 illustrates a cross sectional view showing the suction grill of FIG. 18.

The suction grill 500a is detachably mounted on an upper surface of the cabinet 210 via a fixing means such as a hook or a coupling bolt. In the present embodiment, an auxiliary filter unit attached/detached to the cabinet 210 together with the suction grill 500a on an inside of the suction grill, i.e., at a lower part thereof.

The auxiliary filter unit includes an auxiliary filter member 510, and a filter receiving member 520 integrated with the suction grill 500a and receiving the auxiliary filter member 510. The auxiliary filter member 510 includes an auxiliary filter 511.

In this case, it is desirable that the auxiliary filter member 510 further includes at least one of an electric dust collector, a heap filter, a nano carbon filter, a nano copper filter, and a nano silver filter.

It is also desirable that at least one of the electric dust collector, the heap filter, the nano carbon filter, the nano copper filter, and the nano silver filter is provided at a lower part of the auxiliary filter 511 such that the air drawn in through the suction grill 500a and flowing downward to the auxiliary filter 511. The electric dust collector, the heap filter, the nano carbon filter, and the nano silver filter may be vertically or horizontally arranged.

In the present embodiment, the auxiliary filter member 510 includes the auxiliary filter 511 provided at a lower part of the suction grill 500, and a plurality of electric dust collectors 512 provided at a lower part of the auxiliary filter 511.

In this case, the auxiliary filter 511 is extended to the inside of the third air inlet 219 so as to purify the air drawn into the third air inlet 219 of the cabinet. The plurality of electric dust collectors 512 are arranged horizontally side by side.

In this case, the electric dust collector 512 includes a case 512a, an ionizer 512b provided in the case 512b so as to ionizing dust in the air by an electric discharge and to irradiate light energy, and a collector 512c for collecting the dust ionized by the ionizer 512b, and a Photo-Catalyst Filter 512d for collecting and resolving smell particle.

The ionizer 512b includes a plurality of opposite-side discharge electrodes provided at predetermined intervals and included in a ground electrode, and a discharge electrode (not shown) formed in a wire shape, lying at right angles to an airflow direction between the opposite-side discharge electrodes, and applied with a high voltage so as to form the positive pole (+).

The collector 512c includes a collecting electrode (not shown) for absorbing the dust ionized by the ionizer 512b, and an accelerating electrode (not shown) accelerating the dust ionized by the ionizer 512b to the collecting electrode and having a surface coated with an insulating film.

Meanwhile, an opening (not shown) through which the auxiliary filter 511 and the electric dust collector 512 are placed or withdrawn is provided on at least one side of the filter receiving member 520, particularly in front thereof, and top and bottom of the opening is opened such that the air drawn in through the suction grill 500a flows downward toward the indoor heat exchanger 220.

The filter receiving member 520 includes an auxiliary filter guide 521 provided at a lower part of the suction grill and guiding the auxiliary filter 511 placed or withdrawn through the opening, and a bottom guide 522 provided at a lower part of the auxiliary filter guide 521 and guiding the electric dust collector 512.

In this case, the auxiliary filter guide 521 includes a plurality of ribs protruded inward from the both insides of the filter receiving member 520 so as to guide the placement/withdrawal of the auxiliary filter 511 and at the same time to support and to fix the auxiliary filter 511.

The bottom guide 522 is formed by the bottom of the filter receiving member 520. In more detail, the filter receiving member 520 includes a front frame, and a rear frame provided at the rear of the front frame.

The front frame is integrated with a front bottom surface of the suction grill 500a and includes an opening pierced in a front and back direction. The rear frame is integrated with a rear lower surface of the suction grill 500a.

In this case, the ribs are protruded inward from the both inner walls of the front frame and the both inner walls of the rear frame so as to form the auxiliary filter guide for supporting the auxiliary filter 511 and guiding the placement/withdrawal of the electric dust collector 512. The bottoms of the front frame and the rear frame form the bottom guide 522.

In addition to the aforementioned structure, the auxiliary filter 511 and the plurality of electric dust collectors 512 are placed or withdrawn to/from the filter receiving member through a sliding manner, i.e., a drawer manner.

Although, not illustrated, it is desirable that the auxiliary filter 511 and the electric dust collector 512 include a hook or a rib so as to be fixed at the filter member. The hook or the rib may of course be provided at the auxiliary filter guide 521 and the bottom guide 522.

Meanwhile, an auxiliary power source supplying substrate 531 is provided at the front cabinet 510a so as to supply power source to the electric dust collector 512. A power source applying substrate 532 is provided at a rear end of the electric dust collector 512, the power source applying substrate 532 coming in contact with the auxiliary power source supplying substrate 531 and applying power source to the electric dust collector 512.

When the auxiliary filter unit, together with the suction grill 500a, is mounted at the cabinet of the indoor unit, and the air conditioner is operated, the air drawn in through the suction grill 500a is purified at the auxiliary filter 511 and the electric dust collector 512, and flowed toward the indoor heat exchanger 220.

In the mean time, since the auxiliary filter unit, together with the suction grill 500a, is separated from the cabinet of the indoor unit, it is easy to withdraw the auxiliary filter 511 and the electric dust collector 512 so as to clean/replace the auxiliary filter 511 and the electric dust collector 512.

In other words, when the suction grill 500a is separated for cleaning the auxiliary filter 511 and the electric dust collector 512, the auxiliary filter unit is also separated. In this instance, the auxiliary filter 511 and the electric dust collector 512 are withdrawn in a sliding manner.

Figure 20:
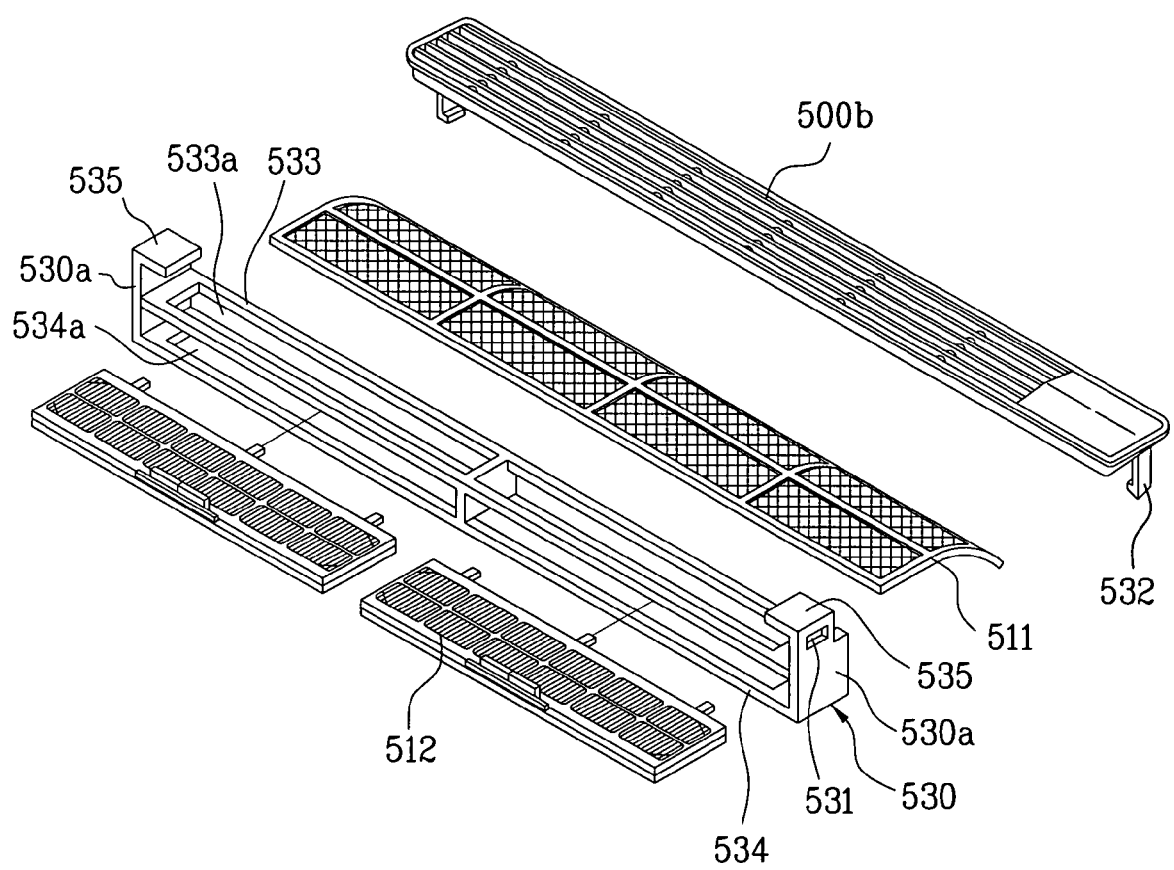
FIG. 20 illustrates a perspective view showing a third embodiment of the suction grill provided at the air conditioner in accordance with the present invention.

With reference to FIGS. 20 and 21, the third embodiment of the suction grill provided at the air conditioner in accordance with the present invention will be described hereunder.

FIG. 20 illustrates a perspective view showing a third embodiment of the suction grill provided at the air conditioner in accordance with the present invention, and FIG. 21 illustrates a cross sectional view showing the suction grill of FIG. 20. Referring to FIGS. 20 and 21, the suction grill 500b in accordance with the present invention includes an auxiliary filter unit separably provided thereat.

The suction grill 500b is detachably provided on an upper surface of the cabinet 210 via a fixing means such as a hook or a coupling bolt. The auxiliary filter unit includes an auxiliary filter member 510 for purifying the air, and a filter receiving member 530 separably provided at a lower part thereof and receiving the auxiliary filter member 510.

In the auxiliary filter unit provided at the third embodiment of the suction grill, since other structural elements are the same as the second embodiment of the suction grill 500a stated above except the filter receiving member 530, repetitive description of which will be omitted.

The filter receiving member 530 is formed in a shelf shape having at least one side, particularly a front side, being opened.

In more detail, the filter receiving member 530 includes an auxiliary filter guide 533 for guiding the auxiliary filter 511, a bottom guide 534 for guiding the electric dust collector 512, and a plurality of both side supporting members 530a for supporting both sides of the auxiliary filter guide 533 and the bottom guide 534.

Both ends of the bottom guide 534 are respectively connected to each of the lower ends of each of the plurality of both side supporting members 530a, and both ends of the auxiliary filter guide 533 are respectively connected to each of the inner surfaces of each of the plurality of both side supporting members 530a.

In this case, the auxiliary filter guide 533 and the bottom guide 534 are spaced from each other in an up and down direction for a predetermined distance corresponding to a thickness of the electric dust collector 512.

The auxiliary filter guide 533 and the bottom guide 534 are pierced in an up and down direction such that the air drawn in through the suction grill 500b flows downward toward the heat exchanger 220.

A guide rib 535 is protruded inward from each of the upper ends of the plurality of both side supporting members 530a of the filter receiving member so as to guide the placement/withdrawal of the auxiliary filter 511 and at the same time prevent the auxiliary filter 511 from escaping.

In addition to the aforementioned structure, the auxiliary filter 511 and the electric dust collector 512 are attached/detached to/from the front portion of the filter receiving member 530. In the mean time, it is desirable that the filter receiving member 530 is coupled with the suction grill 500b via the hook and so on.

For this reason, a hook is provided at one of the suction grill 500b or the auxiliary filter unit, and a hook recess to which the hook is caught is provided at the other one. In more detail, a hook recess 531 is formed on each of the both side supporting member 530a of the filter receiving member, and a hook 532 protruded downward to be caught by the hook recess 531 is provided on each of the both sides of the suction grill 500b. In this case, the hook recess 531 is provided on an outer wall of each of the plurality of both side supporting members, and the hook 532 is spaced from the other one for a predetermined distance such as a length from left to right of the filter receiving member 530.

The filter receiving member 530 may of course be detachably fixed to a suction grill 500b via a coupling means such as a bolt, or glued with a bond.

In the mean time, FIG. 22 illustrates a cross sectional view showing a fourth embodiment of the suction grill provided at the air conditioner in accordance with the present invention, and FIG. 23 illustrates a cross sectional view showing a fifth embodiment of the suction grill provided at the air conditioner in accordance with the present invention.

Referring to FIG. 22, the filter unit provided in the fourth embodiment of the suction grill includes, instead of the electric dust collector 512, an outer case 513a, a heap filter 513b accommodated in the outer case 513a, a plurality of nano carbon filters 513c and 513d provided at a lower part of the heap filter 513b, and a non-woven fabric 513e for preventing carbon from blowing from the nano carbon filters 513c and 513d.

The nano carbon filters 513c and 513d include an oxide nano carbon filter 513c provided at a lower part of the heap filter 513d, and a nitride nano carbon filter 513d provided at a lower part of the oxide nano carbon filter 513c.

Referring to FIG. 23, the auxiliary filter unit provided at the fifth embodiment of the suction grill includes, instead of the electric dust collector 512, an outer case 514a, a nano silver filter 514b provided in the outer case 514a, and a compound filter 514 having a nano copper filter 514c and provided at a lower part of the nano silver filter 514b.

In describing the fourth embodiment and the fifth embodiment of the suction grill in accordance with the present invention, since other structural elements are the same as the second embodiment or the third embodiment of the suction grill stated above except the structural compound filter, identical parts will be given the same names and reference symbols, and repetitive description of which will be omitted.

Meanwhile, the present invention is not limited to the aforementioned embodiments but may include various embodiments such as the filter receiving member provided on a top surface of the suction grill.

Effects of the air conditioner in accordance with the present invention will be summarized as follows.

First, according to the air conditioner of the present invention, when the filter unit is provided at the indoor unit, the air purifying function is improved, and when the suction grill is provided thereat, air suction resistance is reduced such that the air amount to be drawn is increased and the air amount discharged from the indoor unit is increased.

Second, according to the air conditioner of the present invention, the filter unit is mounted at the indoor unit, thus the air conditioner can be driven, without driving a compressor, in an air purifying mode that carries out only a function for purifying the room air.

Third, according to the air conditioner of the present invention, since the filter member of the filter unit includes an electric dust collector, a heap filter, a nano carbon filter, and a nano silver filter, the air purification efficiency is improved.

Fourth, according to the air conditioner of the present invention, a placement/withdrawal guide for guiding the filters is provided in the filter case and thus the filter is easily placed or withdrawn to/from the filter case through a sliding manner.

Fifth, according to the air conditioner of the present invention, a rotatable louver is provided at the air inlet of the filter unit such that the air drawn into the filter unit is smoothly guided to the filter member during the operation of the air conditioner, and the impurities are prevented from being entered into the filter unit.

Sixth, since the auxiliary filter unit is detached together with the suction grill when the auxiliary filter unit for purifying the air is provided at the suction grill, it is easy to clean or replace the filter.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An air conditioner comprising:
   a cabinet having a first air inlet formed on an upper surface thereof for drawing in the air, the first air inlet being configured to selectively receive both a filter unit and a suction grill for purifying the air, said selectively received filter unit and suction grill being removably secured at the first air inlet, a second air inlet formed on a front surface thereof, and an air outlet for discharging purified air; and
   a fan provided at the cabinet and forcing the air movement.

2. The air conditioner of claim 1, wherein the filter unit comprises:
   a filter case having an air inlet and a first air outlet formed thereon, the first air outlet communicating with the first air inlet of the cabinet; and
   a filter accommodated in the filter case and purifying the air.

3. The air conditioner of claim 2, wherein the filter case comprises a placement/withdrawal guide for guiding the placement/withdrawal of the filter.

4. The air conditioner of claim 3, wherein the placement/withdrawal guide comprises a rib protruded from an inner wall of the filter case and having a filter slid thereinto.

5. The air conditioner of claim 2, wherein the filter case further comprises a louver being rotatable for opening and closing the air inlet of the filter case.

6. The air conditioner of claim 5, wherein the louver guides the air drawn through the air inlet of the filter case to the filter.

7. The air conditioner of claim 1, further comprising a front panel for opening/closing the second air inlet.

8. An air conditioner comprising:
   a cabinet having a first air inlet for drawing in the air, and an air outlet for discharging purified air;
   a fan provided at the cabinet and forcing the air movement;
   a filter unit and a suction grill selectively received by the first air inlet, said selectively received filter unit and suction grill being removably secured at the first inlet; and
   an auxiliary filter unit provided inside of the suction grill and, together with the suction grill, attached/detached to/from the cabinet.

9. The air conditioner of claim 8, wherein the auxiliary filter unit comprises an auxiliary filter for purifying the air, and a filter receiving member for accommodating the auxiliary filter.

10. The air conditioner of claim 9, wherein the filter receiving member comprises an auxiliary filter guide fir supporting the auxiliary filter and guiding the placement/withdrawal of the auxiliary filter.

11. The air conditioner of claim 8, wherein the filter receiving member and the suction grill are formed as a single body.

12. The air conditioner of claim 8, wherein the filter unit is detachably provided at the suction grill.

13. An air conditioner comprising:
    a cabinet of an indoor unit having a first air inlet formed on an upper surface thereof, the first air inlet including a suction grill for purifying the air, the suction grill being removably attached at the first air inlet, a second air inlet formed on a front surface thereof, and an air outlet for discharging purified air;
    a fan provide at the cabinet and forcing the air movement;
    a front for opening/closing the second air inlet; and
    an auxiliary filter unit provided at a lower part of the suction grill and, together with the suction grill, attached/detached to/from the cabinet.

14. The air conditioner of claim 13, wherein the auxiliary filter unit comprises:
    an auxiliary filter for purifying the air; and
    a filter receiving member for accommodating the auxiliary filter.

15. The air conditioner of claim 14, wherein the filter receiving member comprises an auxiliary filter guide for supporting the auxiliary filter and guiding the placement/withdrawal of the auxiliary filter.

16. The air conditioner of claim 15, wherein the auxiliary filter guide comprises at least one opening formed on a side thereof and through which the auxiliary filter is place/withdraw.

17. The air conditioner of claim 16, wherein the auxiliary filter is slid from the front of the auxiliary filter guide so as to be provided thereat.

18. The air conditioner of claim 17, wherein the filter receiving member is pierced in an up and down direction such that the air drawn through the suction grill is flowed downward thereof.

19. The air conditioner of claim 13, wherein the filter receiving member is integrated into the suction grill.

20. The air conditioner of claim 13, wherein the auxiliary filter unit is separably provided at the suction grill.

21. The air conditioner of claim 20, wherein one of the suction grill and the auxiliary filter unit comprises a hook, and the other one comprises a hook recess in which the hook is caught.

* * * * *